US012586405B2

(12) United States Patent
Saggese et al.

(10) Patent No.: US 12,586,405 B2
(45) Date of Patent: Mar. 24, 2026

(54) FINGERPRINT CAPTURE DEVICES, SYSTEMS AND METHODS

(71) Applicant: Synolo Biometrics, Inc., San Diego, CA (US)

(72) Inventors: Steven J. Saggese, San Diego, CA (US); Tom Kalisky, San Diego, CA (US); Greg B. Scott, San Diego, CA (US)

(73) Assignee: Synolo Biometrics, Inc., San Diego, CA (US)

( * ) Notice: Subject to any disclaimer, the term of this patent is extended or adjusted under 35 U.S.C. 154(b) by 0 days.

(21) Appl. No.: 19/092,278

(22) Filed: Mar. 27, 2025

(65) Prior Publication Data

US 2025/0349149 A1 Nov. 13, 2025

Related U.S. Application Data

(63) Continuation of application No. PCT/US2023/075222, filed on Sep. 27, 2023.

(60) Provisional application No. 63/410,561, filed on Sep. 27, 2022.

(51) Int. Cl.
*G06V 40/13* (2022.01)

(52) U.S. Cl.
CPC .................................... *G06V 40/13* (2022.01)

(58) Field of Classification Search
CPC ...... G06V 40/12; G06V 40/13; G06V 10/147; G06V 10/40; G06V 40/1359; G06V 40/1353; G06V 40/1329
See application file for complete search history.

(56) References Cited

U.S. PATENT DOCUMENTS

| | | | | |
|---|---|---|---|---|
| 5,546,471 | A | * | 8/1996 | Merjanian ................ G07C 9/37 |
| | | | | 382/126 |
| 5,991,431 | A | * | 11/1999 | Borza ................. G06F 3/03543 |
| | | | | 382/314 |
| 10,496,870 | B2 | | 12/2019 | Aronoff-spencer et al. |
| 11,003,883 | B2 | | 5/2021 | Aronoff-spencer et al. |

(Continued)

FOREIGN PATENT DOCUMENTS

| | | | |
|---|---|---|---|
| CN | 110414354 | A | 11/2019 |
| JP | 2025537626 | A | 11/2025 |

(Continued)

OTHER PUBLICATIONS

Extended European Search Report issued in European Application No. 23873869.4 mailed on Jul. 22, 2025, 11 pages.

(Continued)

*Primary Examiner* — Lixi C Simpson
(74) *Attorney, Agent, or Firm* — Dorsey & Whitney LLP

(57) ABSTRACT

A fingerprint capture device includes a removable, magnetically attached finger aperture selector to facilitate reconfiguration of the device to image a wide range of finger sizes and body regions. The device housing and the selector are also configured for one-handed use, based on the angle and location of the imaging actuator and the selector relative to the device handle. The device includes a camera calibration mount to facilitate adjustments to the camera alignment. Software that is usable with the device can normalize the fingerprint characteristics based on the age and individual characteristics of the subject being imaged.

25 Claims, 29 Drawing Sheets

100

(56) References Cited

U.S. PATENT DOCUMENTS

| | | | | |
|---|---|---|---|---|
| 12,036,003 | B2 * | 7/2024 | Aronoff-Spencer ... | G06V 40/70 |
| 2006/0115132 | A1 * | 6/2006 | Schneider ............. | G06V 40/13 |
| | | | | 382/126 |
| 2020/0074132 | A1 | 3/2020 | Shannon et al. | |
| 2020/0074198 | A1 | 3/2020 | Oh et al. | |
| 2020/0242323 | A1 | 7/2020 | Jiang et al. | |
| 2022/0071489 | A1 | 3/2022 | Aronoff-spencer et al. | |

FOREIGN PATENT DOCUMENTS

| | | | |
|---|---|---|---|
| WO | 2020132645 | A1 | 6/2020 |
| WO | 2024073480 | A1 | 4/2024 |

OTHER PUBLICATIONS

International Preliminary Report on Patentability issued in International Application No. PCT/US2023/075222, mailed on Apr. 10, 2025, 12 pages.

Moolla, et al., "Biometric Recognition of Infants using Fingerprint, Iris, and Ear Biometrics", IEEE Access, vol. 9, pp. 38269-38286, 2021, doi: 10.1109/ACCESS.2021.3062282.

International Search Report and Written Opinion issued in International Application No. PCT/US2023/075222, mailed on Jan. 26, 2024, 13 pages.

Saggese, et al., "Biometric Recognition of Newborns and Infants by Non-Contact Fingerprinting: Lessons Learned", Gates Open Research, vol. 3, 25 pages, Nov. 5, 2019.

\* cited by examiner

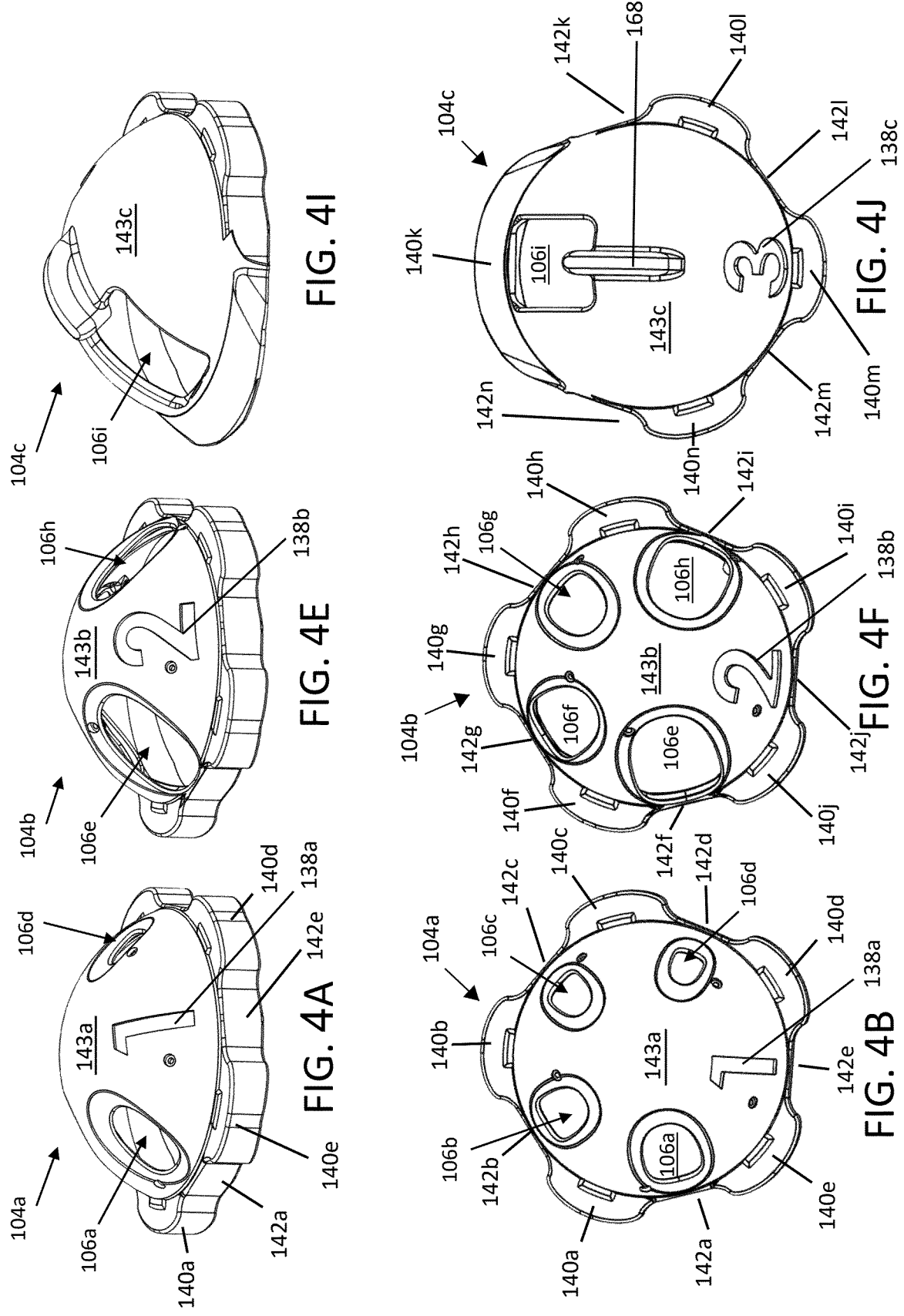

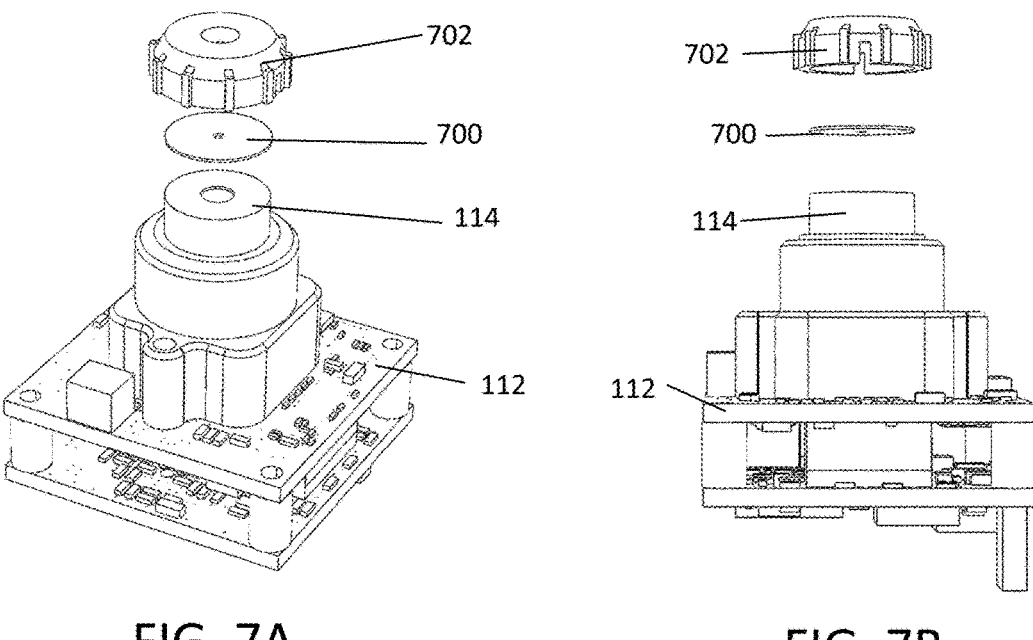
FIG. 7A
FIG. 7B
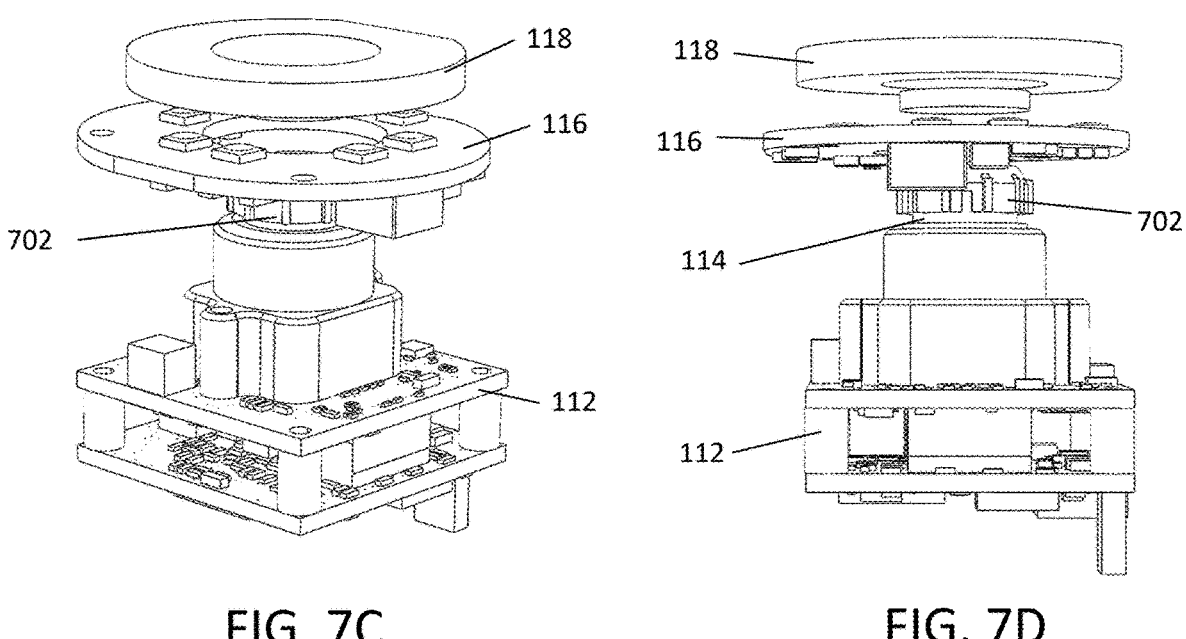
FIG. 7C
FIG. 7D

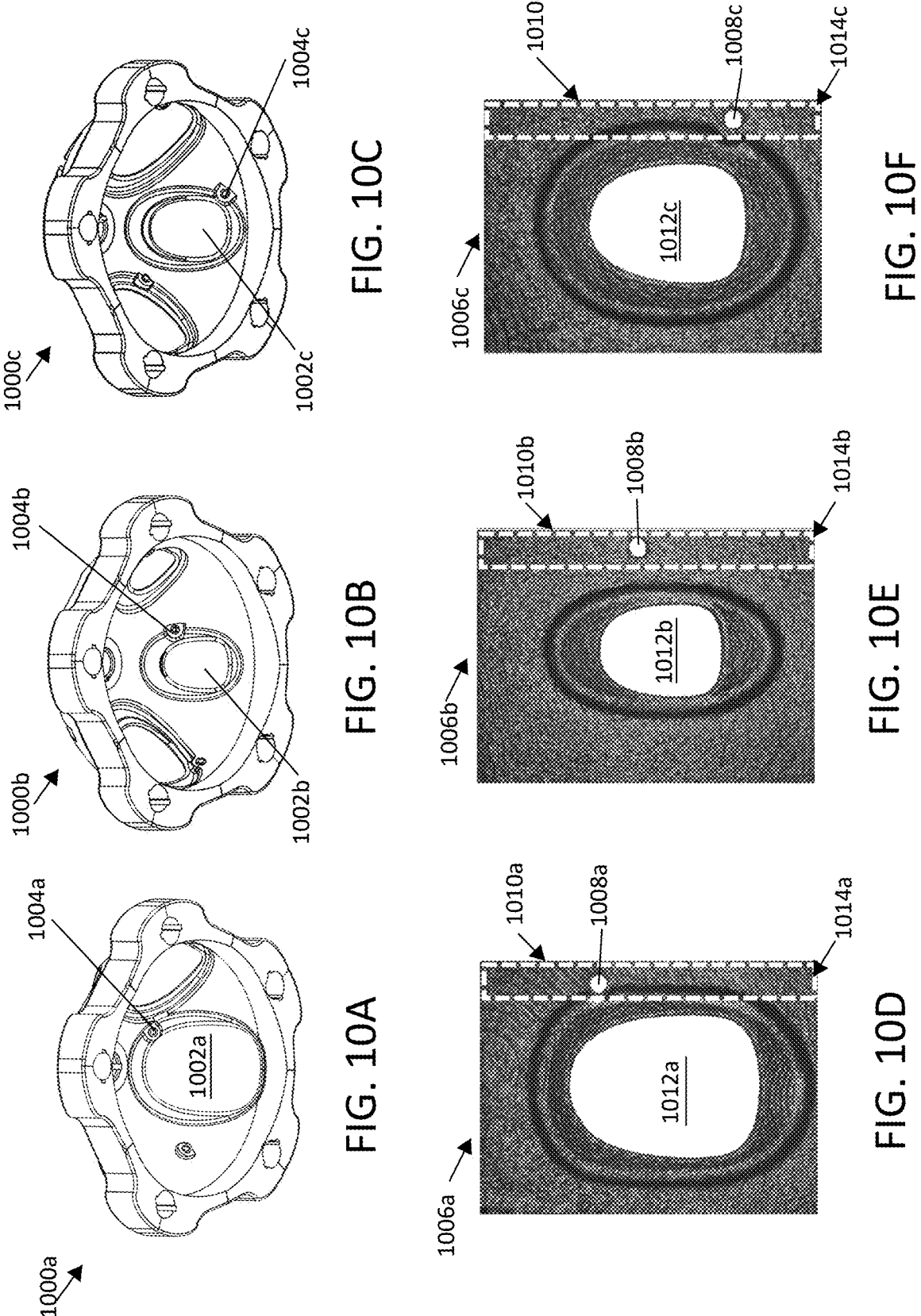

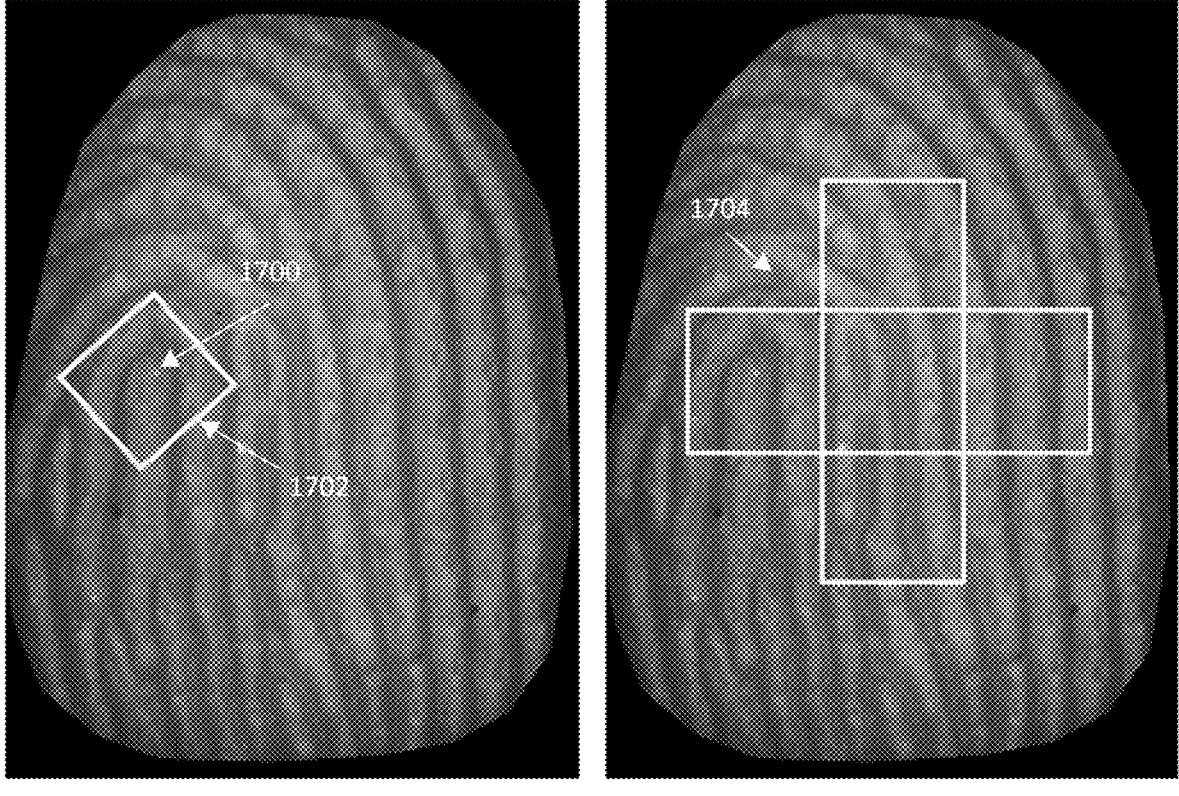
FIG. 17A                                    FIG. 17B

1900

1914

1912

1902

1904a

1904b

110

FINGERPRINT CAPTURE DEVICES, SYSTEMS AND METHODS

CROSS REFERENCE TO RELATED APPLICATIONS

This application is a continuation of International Application No. PCT/US2023/075222, filed on Sep. 27, 2023, which in turn claims the priority benefit of U.S. Provisional Patent Application Ser. No. 63/410,561, filed on Sep. 27, 2022, which is hereby incorporated by reference in its entirety herein. This application is also related to U.S. Pat. No. 10,496,870, filed on Mar. 6, 2018, U.S. Pat. No. 11,003,883, filed Mar. 7, 2018, U.S. Pub. No. 2022/0071489, filed Dec. 20, 2019, and PCT Pub. No. WO/2020/132645A1, filed Dec. 20, 2019, all of which are hereby incorporated by reference in their entirety herein.

BACKGROUND

This invention relates generally to fingerprinting, and more specifically to methods and apparatus for non-contact fingerprinting of newborns, infants, toddlers, children and adults.

BRIEF SUMMARY

In one embodiment, a fingerprint capture device includes a removable, magnetically attached finger aperture selector to facilitate reconfiguration of the device to image a wide range of finger sizes and body regions. The device housing and the selector are also configured for one-handed use, based on the angle and location of the imaging actuator and the selector relative to the device handle. The device includes a camera calibration mount to facilitate adjustments to the camera alignment. Software that is usable with the device can normalize the fingerprint characteristics based on the age and individual characteristics of the subject being imaged.

In one embodiment, a fingerprint input system is provided, comprising a main housing, comprising an elongate handle comprising a longitudinal axis, and a rotation hub integrally formed with the elongate handle, the hub comprising an upper convex surface, an imaging opening in the upper convex surface, and a circular flange surrounding the upper convex surface, the circular flange comprising a superior undulating surface, a center hub magnet located in a center of the rotation hub, a plurality of peripheral hub magnets equally spaced around the circular flange and each of the plurality of hub magnets located a same hub radial distance from a center of the rotation hub, an actuator located on a front surface of the elongate handle, an imaging assembly inside the elongate handle and comprising an imaging axis, a detachable rotary aperture top configured to form rotational interface with the rotation hub, the selector comprising a concave lower surface configured to form a complementary rotational interface with the upper convex surface of the hub, a plurality of finger receiving apertures, wherein each aperture is a different size and comprises a chamfered perimeter edge located in an aperture plane, and a plurality of flanges surrounding the concave lower surface and configured to extend radially outward beyond the circular flange of the rotation hub, wherein the plurality of flanges are radially offset from the plurality of finger receiving apertures, and wherein the plurality of flanges each comprise an undulating surface complementary to a portion of the undulating surface of the circular flange of the rotation hub, and a center top magnet located in a center of the detachable rotary aperture top, wherein the center of the detachable rotary aperture top and the center of the rotation hub define a rotation axis, and a plurality of peripheral top magnets equally spaced around the plurality of flanges and each of the plurality of top magnets located a same top radial distance from a center of the top.

In another embodiment, a fingerprint input system is provided, comprising a main housing, comprising an elongate handle comprising a longitudinal axis, and a rotation hub integrally formed with the elongate handle, the hub comprising a hub interface surface, a center, an imaging opening in the hub surface, and a first plurality of alignment structures equally spaced around the rotation hub and each of the plurality of alignment structures are located a same hub radial distance from the center of the rotation hub, an actuator located on the elongate handle, an imaging assembly inside the elongate handle and comprising an imaging axis, a detachable rotary aperture top configured to form rotational interface with the rotation hub, the selector comprising a top interface surface configured to form a complementary rotational interface with the upper convex surface of the hub and comprising a center, wherein the center of the top and the center of the hub define a rotation axis, a plurality of finger receiving apertures, wherein each aperture is a different size and comprises a chamfered perimeter edge located in an aperture plane, a plurality of flanges surrounding the top interface surface and configured to extend radially outward beyond the rotation hub, wherein the plurality of flanges are radially offset from the plurality of finger receiving apertures, and a second plurality of alignment structures arranged in a configuration complementary to the first plurality of alignment structures located on the rotation hub. The device may further comprise an adjustable camera alignment mount. The adjustable camera alignment mount may comprise a frame and three adjustment screws. The frame may comprises a polygonal shape with four sides and four corners, with first of the three adjustment screws located in the middle of one of the four sides and the second and third adjustment screws located at two of the four corners farthest from the first screw. The adjustable camera alignment mount may be releasably couplable to the imaging assembly via mount magnets attached to the frame. The imaging assembly may be located in a frame opening of the frame. The three magnets may be embedded in the frame, and wherein the three adjustment screws are magnetically attachable to the magnets. The three adjustment screws may be attached to the main housing. The system may further comprise a first heatsink thermally coupled to the imaging assembly. The system may further comprise a lighting assembly with a plurality of light sources within the main housing. The lighting assembly may comprise a circular base. The system may further comprise a light diffuser above the lighting assembly. The system may further comprise a lighting heatsink thermally coupled to an inferior surface of the lighting assembly. The system may further comprise a camera support between the imaging assembly and the adjustable camera alignment mount. The first plurality of alignment structures and the second plurality of alignment structures may each comprise magnets. The system may further comprise a third plurality of alignment structures located on the rotation hub and a fourth plurality of alignment structures complementary to the third plurality of alignment structures and located on the detachable rotary aperture top. The third plurality of alignment structures may comprise a plurality of alternating undulating or ramp surfaces, and the fourth plurality of alignment structures may comprise a plurality of alternating undulating or ramp surfaces complementary to the third plurality of alignment structures. The third plurality of alignment structures may be located along a superior peripheral circular surface of the rotation hub. The fourth plurality of alignment structures may be located on inferior surfaces of the plurality of flanges. The system may further comprise an elongate planar measurement tool comprising a plurality of different apertures arrange serially by size along the tool. The measurement tool may further comprise a plurality of ordinal indicia corresponding to the plurality of different apertures. The fingerprint devices described herein are designed to collect platen-free fingerprints, and other body parts, over a wide range of ages and physical sizes in a consistent manner. This system design addresses many of the issues associated with collecting fingerprints with traditional non-contact devices, primarily cell phone-based camera biometric systems. With cell phone-based camera systems, the camera and finger of the subject to be imaged are held independently in free space. The subject holds a finger in front of the camera and the distance between the finger and the camera can vary, thus changing the image size and the spatial resolution of the pixels of the finger. Each cell phone also has a focus range which must be adhered to in order to get sharp images. Before the fingerprint image can be analyzed and stored as a fingerprint template, the inconsistent spatial resolution needs to be normalized to a standard 500 pixels/inch to be compatible with other automated biometric identification systems (ABIS). The finger is also held in free space in front of the camera; thus the user needs to be concerned with whether the fingerprint(s) is properly facing and aligned with the camera. In addition, there is a concern as to what is visible in the background behind the subject. Bright lights and/or a similarly colored background scene could make it difficult to isolate the finger image. Camera cell phone fingerprint systems do not use specific hardware but are software applications that can be hosted on a wide variety of cell phone devices. Each cell phone device manufacturer and model will have different total pixel counts, optical resolutions, fields-of-view, and light source powers and light source spectral characteristics. All of these variables need to be accounted for with fingerprint software programs that use cellphones to collect finger images. Cellphone based systems are also designed for adult-use only and do not have any corrections for infants or children. The current device here is designed to eliminate or minimize the issues described, including for use on all ages from infants to adults, and are also improvements to earlier developed designs described in U.S. Pat. Nos. 10,496,870, 11,003,883, U.S. Pub. No. 2022/0071489, PCT Pub. No. WO/2020/132645A1, and Saggese S, Zhao Y, Kalisky T et al. Biometric recognition of newborns and infants by non-contact fingerprinting: lessons learned, Gates Open Research 2019, 3:1477.

BRIEF DESCRIPTION OF THE DRAWINGS

FIGS. 4A to 4D are perspective, top, bottom and side views, respectively, of one exemplary embodiment of a rotary aperture top; FIGS. 4E to 4H are perspective, top, bottom and side views, respectively, of another exemplary embodiment of a rotary aperture top; FIGS. 4I to 4L are perspective, top, bottom and side views, respectively, of still another exemplary embodiment of a rotary aperture top;

FIG. 7A is a perspective exploded view of an imaging configuration. FIG. 7B is a side exploded view of an imaging configuration in FIG. 7A. FIG. 7C is a perspective view of a fixed optical configuration. FIG. 7D is a side view of the fixed optical configuration in FIG. 7C.

FIGS. 10A to 10C show a perspective view of the dot locations on the rotary aperture top.

FIGS. 10D to 10F show captured images of the apertures and dots in FIGS. 10A to 10C.

FIG. 17A shows a raw image of a finger with the automatic detection of a core shown, and FIG. 17B shows the five different locations that is suggested to the user to place the core during image collection.

DETAILED DESCRIPTION

Figures 1A, 1B, 1C, 1D:
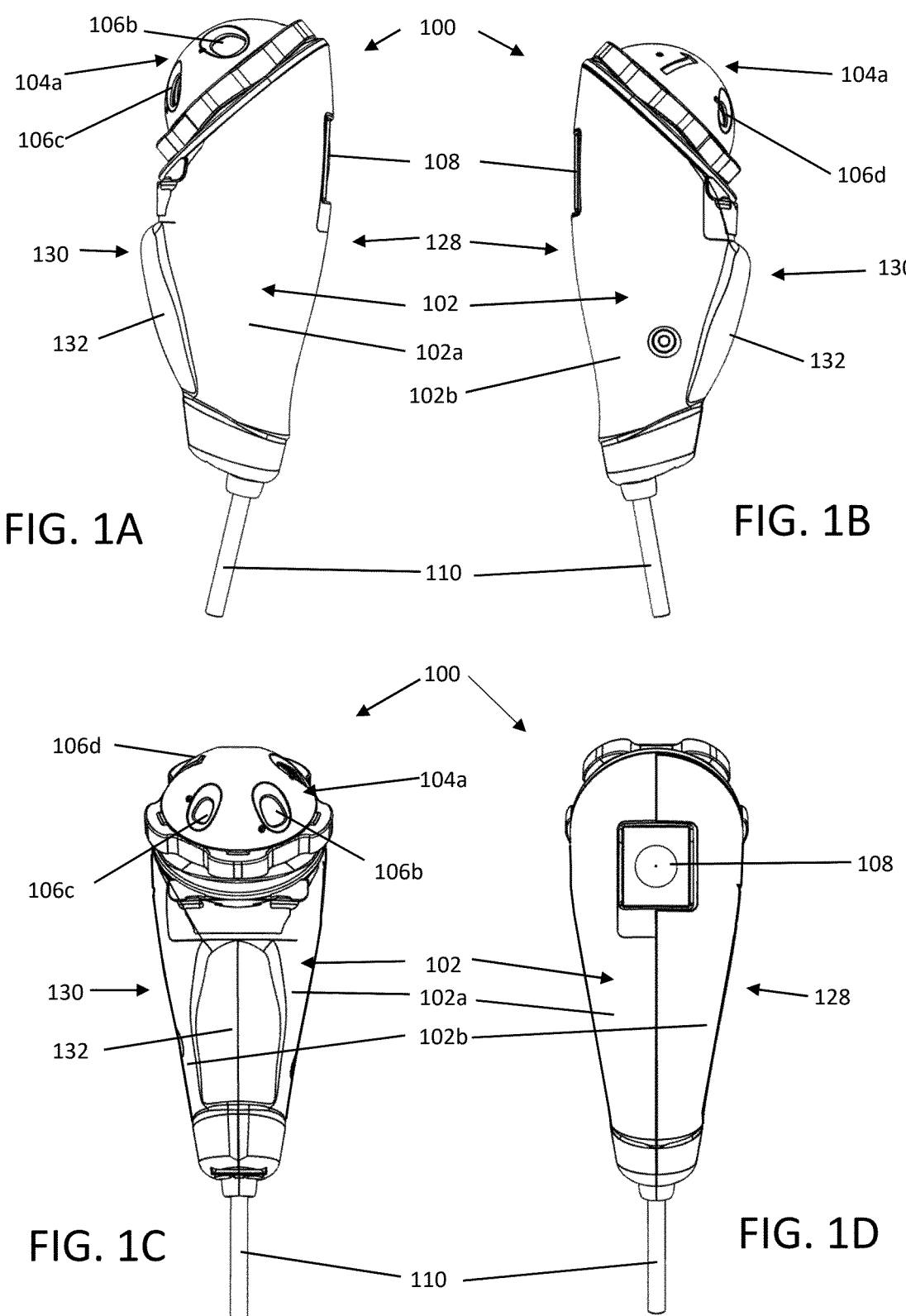
FIGS. 1A and 1B are left and right side views of one embodiment of a fingerprint capture device.
FIGS. 1C and 1D are front and rear views of the device in FIGS. 1A and 1B.
Figure 1F:
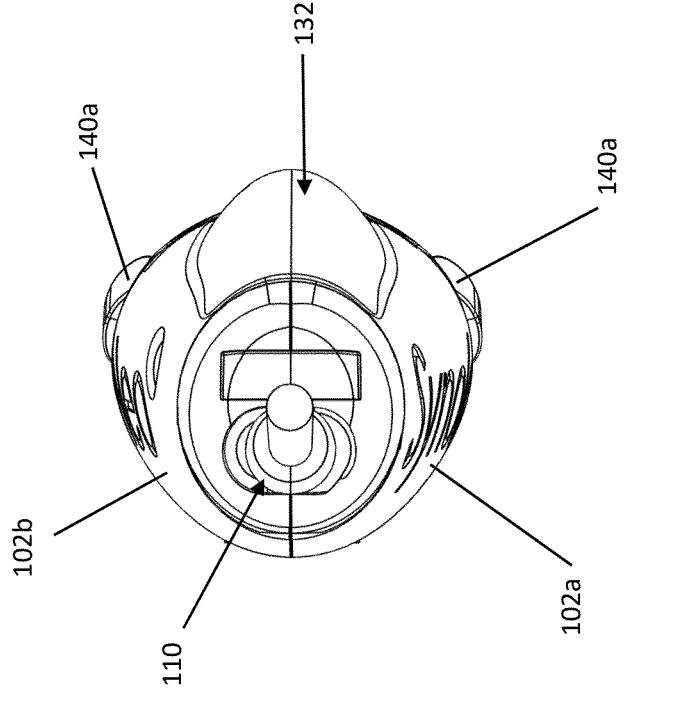
FIGS. 1E and 1F are top and bottom views of the device in FIGS. 1A to 1D.

The device comprises a self-contained camera system that has a dedicated camera with fixed focal length optics, integrated light source, and a fixed optical configuration that positions the subject's finger (or other body part) at a specific location with the use of an adjustable aperture that the subject rests their finger upon. The device 100 is small enough for single hand operation and an exemplary overall design is depicted in FIGS. 1A to 1F, comprising external view of the assembled device 100, comprising a main housing 102, a rotary top 104a configured for selecting the size of the finger support aperture 106a-d, a trigger or actuator 108 to initiate the collection of images and a communication link 110, such as a USB cable connecting the device to a computer. In some variants, a wireless communication link via Bluetooth or other wireless communication protocol may be provided. FIG. 1G shows an exploded view of the device 100 depicting the internal and external system components. FIG. 1H shows the device in position for use and FIG. 1I shows the subject finger being paced onto the aperture for image collection while the device is held by the user.

In this exemplary embodiment, the main housing 102 may comprise a two-piece shell 102a, 102b configured to form a complementary interfit with each other, and to define an interior cavity to contain the camera assembly 112 with lens 114, lighting assembly 116 and window/diffuser. The two shells 102a, 102b together form a handle region 120 of the housing 102, and one shell 102a includes or both shells together form a rotation hub 122 to which the rotary top 104a is releasably attached. Additionally, the device may also include a camera mounting assembly 170, which may be used to adjust the alignment of the camera assembly 112 during manufacturing and/or servicing, one or more heatsinks in the camera assembly and/or lighting assembly, additional optic devices such as a camera aperture structure 152 and aperture support structure 154, an optically clear window 156 and window seal to protect the interior contents of the device 100.

The main housing 102 may comprise a generally elongate shape, with a proximal end 124 from which the wired communication link or cable 110 may extend, a distal end 126 where the rotation hub 122 is located, a ventral surface 128 where the actuator 108 may be located, and a dorsal surface 130. The main housing 102 may further comprise gripping structures on its exterior surface to reduce slippage and improve stability when using the device 100. In this particular embodiment, a flat palm grip structure 132 is optionally provide on the dorsal surface to increase contact and with the flexed palm of the user when grasped, which may reduce torqueing or rotation of the device 100 during use.

Figure 1E:
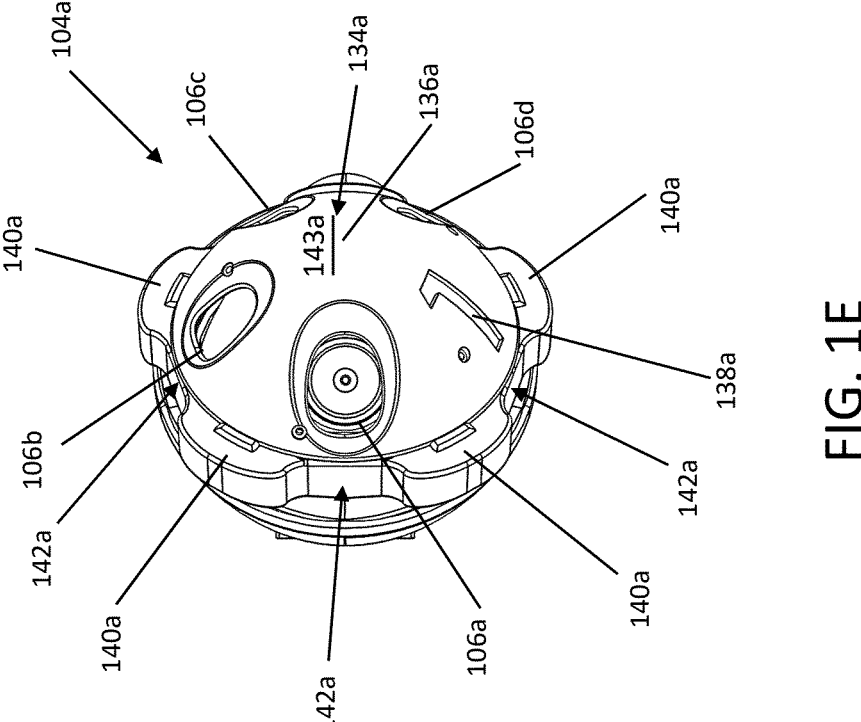
Figure 1G:
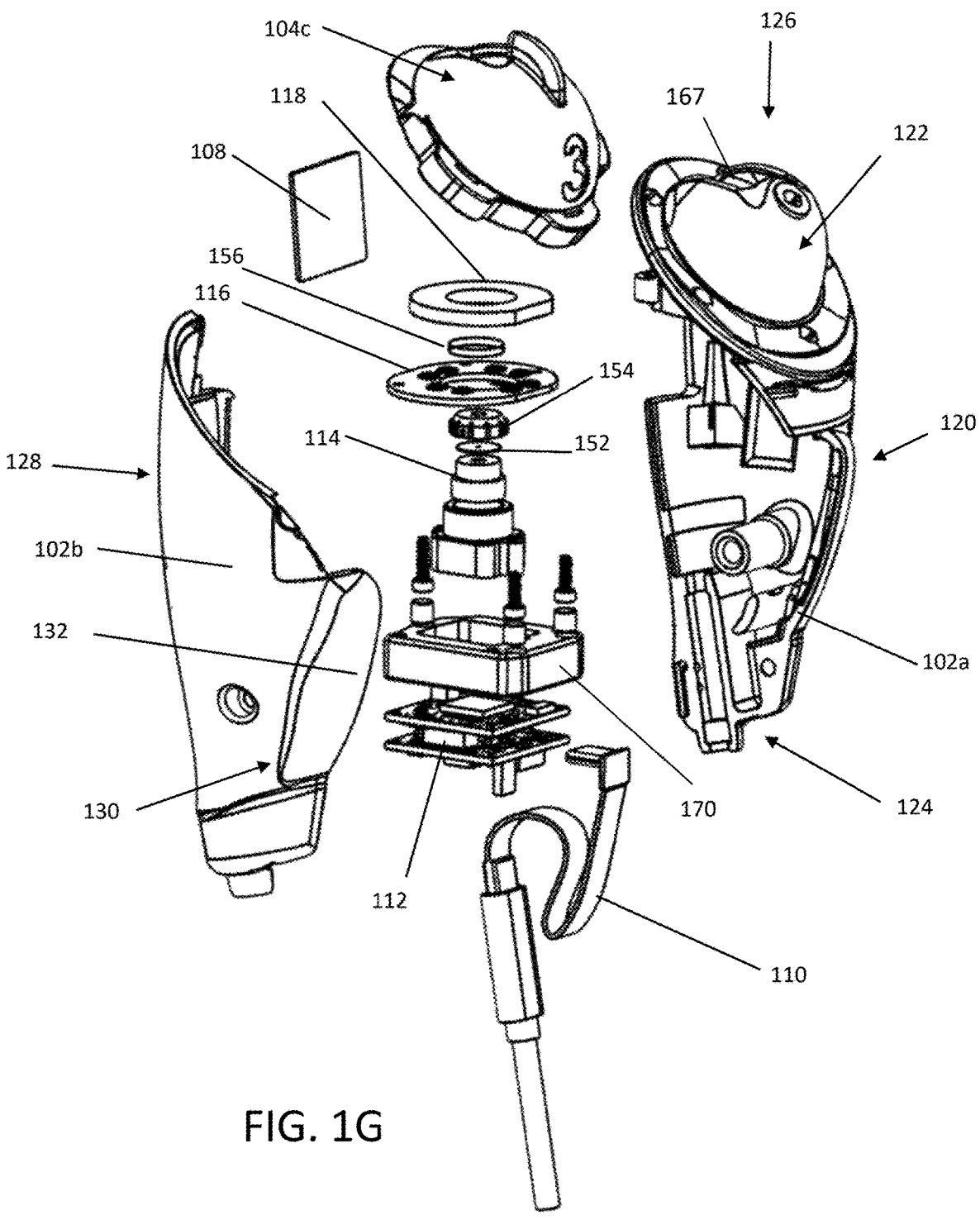
FIG. 1G is a perspective exploded view of the device in FIGS. 1A to 1F.
Figures 1H, 1I:
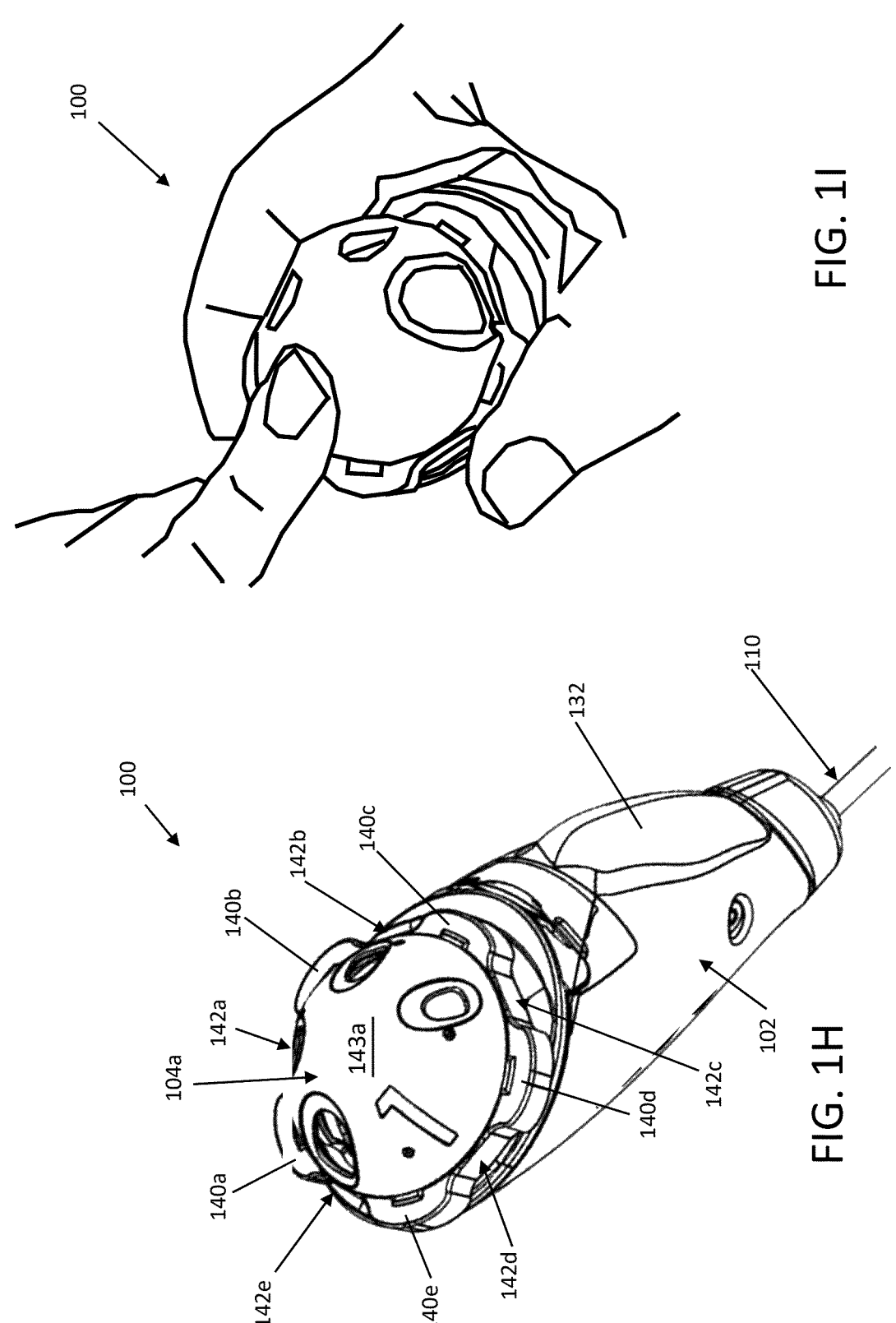
FIG. 1H is a top perspective view of the device in FIGS. 1A to 1F.
FIG. 1I depicts in the device in FIG. 1H in use.

As depicted in FIG. 1E, the rotary top 104a comprises a generally dome-shaped structure 134a with a plurality of apertures 106a-d spaced around a rotation center 136a of the top 104a, with each aperture 106a-d having a different size but where the center-to-center spacing of adjacent apertures 106a-d are the same, and wherein the aperture plane angle of each aperture 106a-d relative to a central rotation axis through the rotation center 136a of the rotary top 104a is the same. This arrangement allows the user to maintain imaging consistency with the camera assembly regardless of the selected aperture 106a-d. Indicia 138a may be provided on the top 104a to facilitate identification of the aperture size range, subject age, and/or body part associated with each rotary top. To facilitate the rotation of the rotary top 104a to select the desired aperture 106a-d, a series of alternating flanges 140a and finger recesses 142a may be around the edge or periphery of the dome structure 143a. The flanges 140a may comprise a radial outward height of 3 mm to 4 mm, 3 mm to 8 mm, or 2 mm to 10 mm, and circumferential length of 20 mm to 25 mm, 22 mm to 30 mm, or 15 mm to 35 mm, and a longitudinal height of 8 mm to 10 mm, 6 mm to 15 mm, or 5 mm to 15 mm. The recesses may have a complementary radial outward height and longitudinal height corresponding to the flanges 140a, but the circumferential length may be the same, smaller or larger than the flanges 140a, having a circumferential length of 10 mm to 13 mm, 8 mm to 20 mm, or 11 mm to 15 mm. To facilitate image capture, the middle of each recess 142a may be radially aligned with the center of each aperture 106a-d, except for the recess 142a located adjacent to the indicia 138a, if any.

Figures 1J, 2A, 2B, 2C:
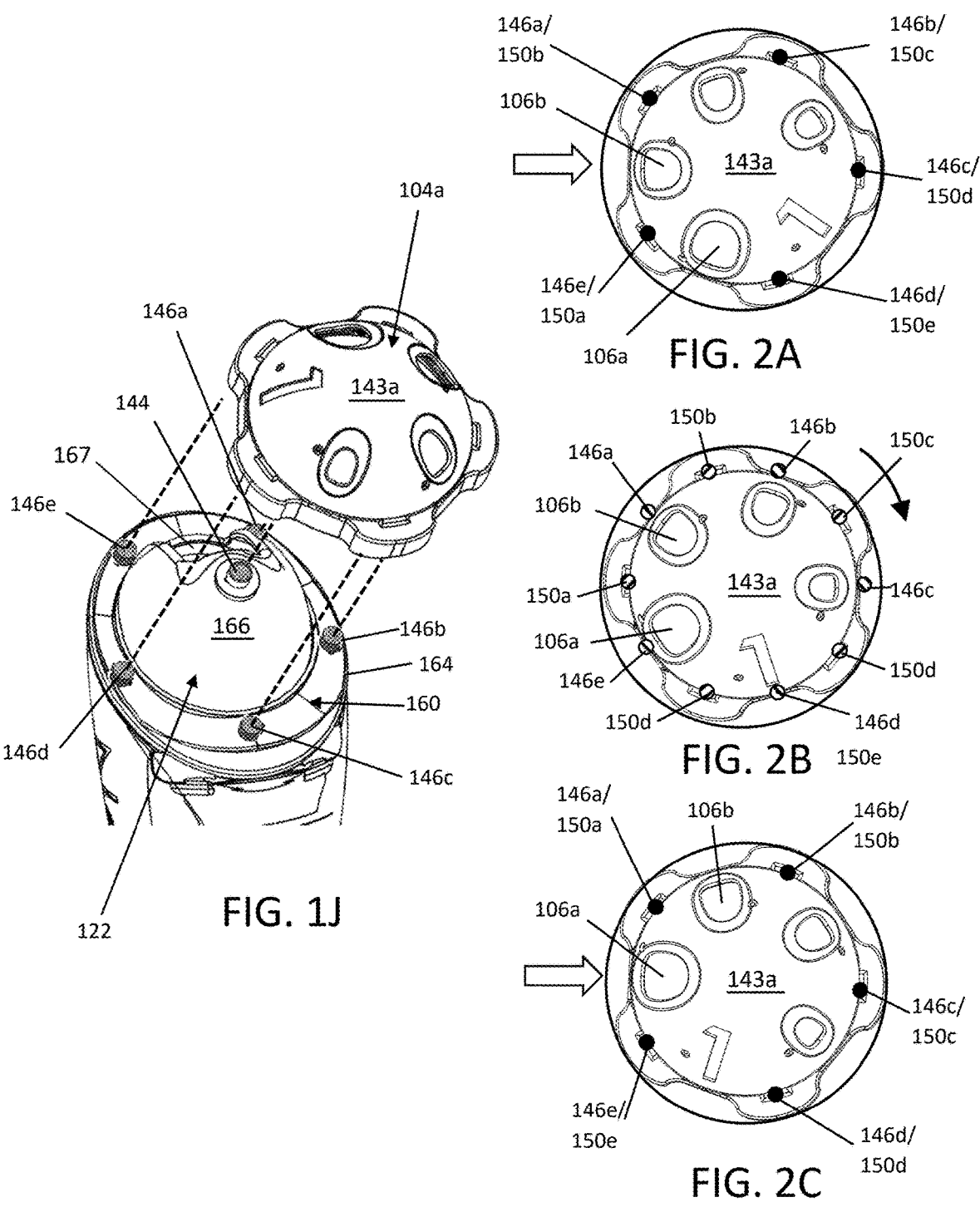
FIG. 1J schematically depicts the alignment of the rotary aperture top and the main housing.
FIG. 2A is a schematic top view of the alignment of the rotary aperture top with the magnetic interface.
FIG. 2B schematically depicts the rotation of the rotary aperture top.
FIG. 2C is a schematic top view of the realignment of the rotary aperture top in a different position than in FIG. 2A.
Figures 4C, 4D, 4G, 4H, 4K, 4L:
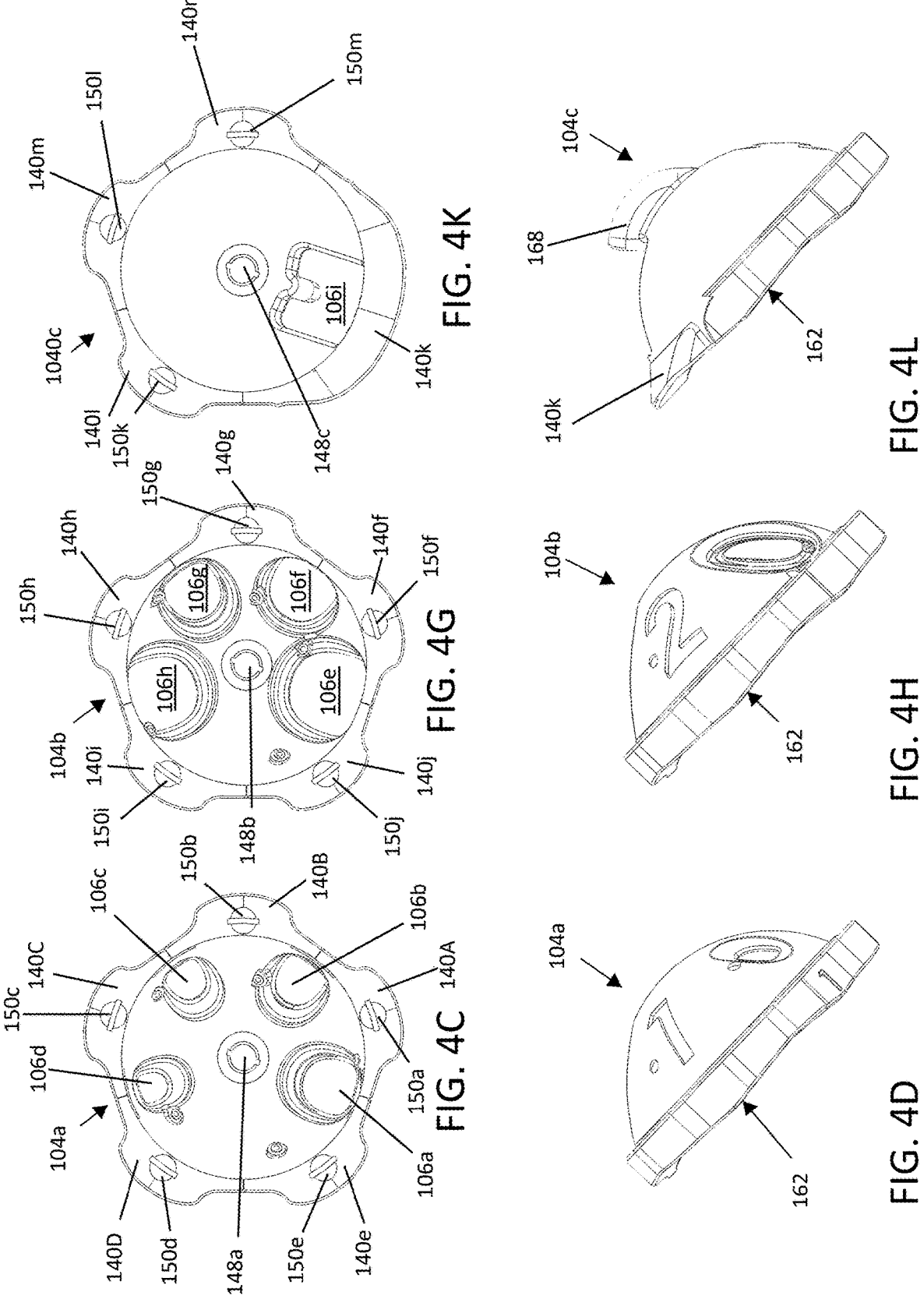
Figures 5A, 5B, 5C:
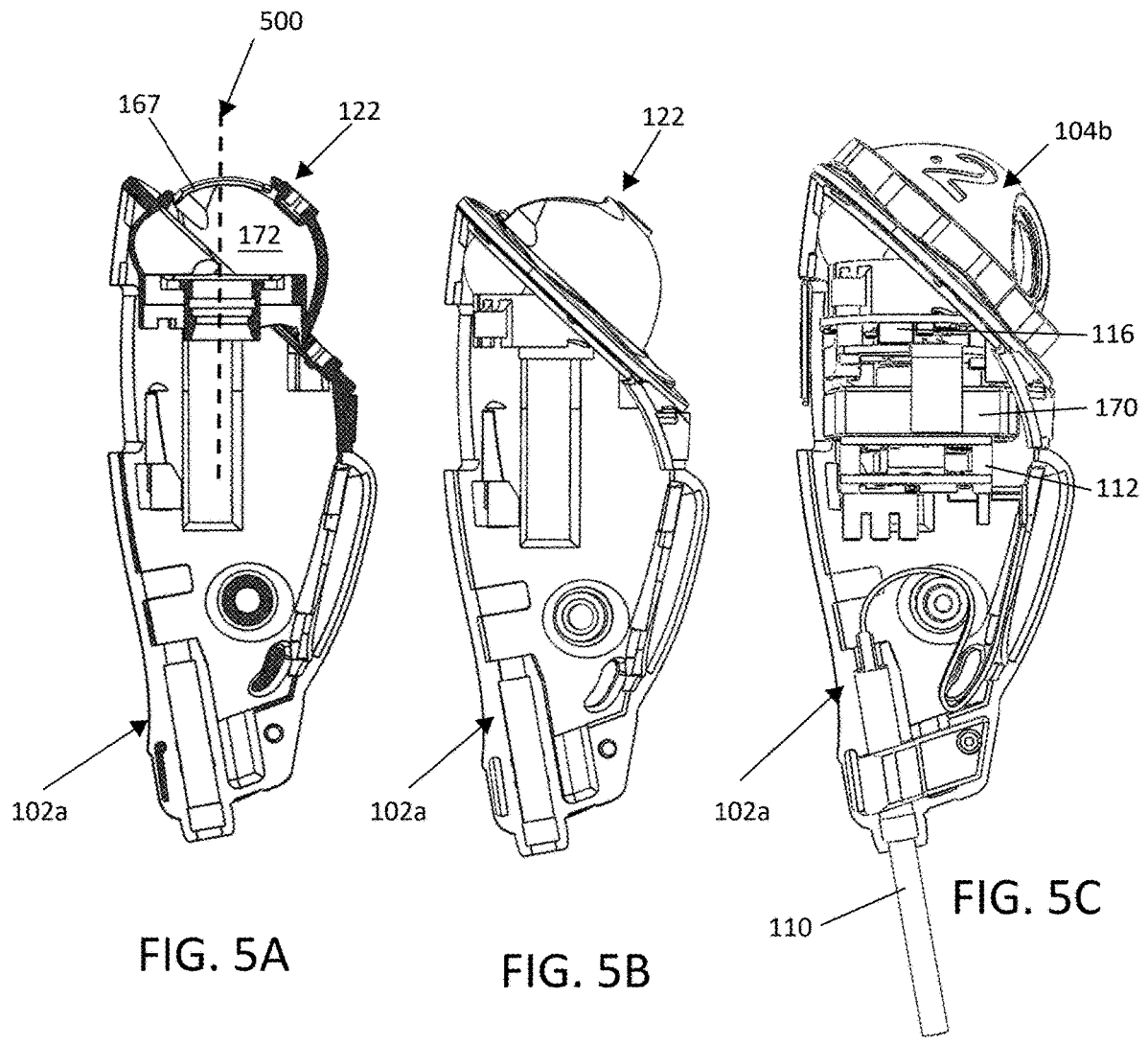
FIG. 5A is a longitudinal cross-sectional view of the main housing with the optical centerline indicated.
FIG. 5B is an orthogonal side view of a longitudinal cross-sectional view of the main housing.
FIG. 5C is an orthogonal side view of a longitudinal cross-sectional view through a fully assembled fingerprint capture device.
Figure 5D:
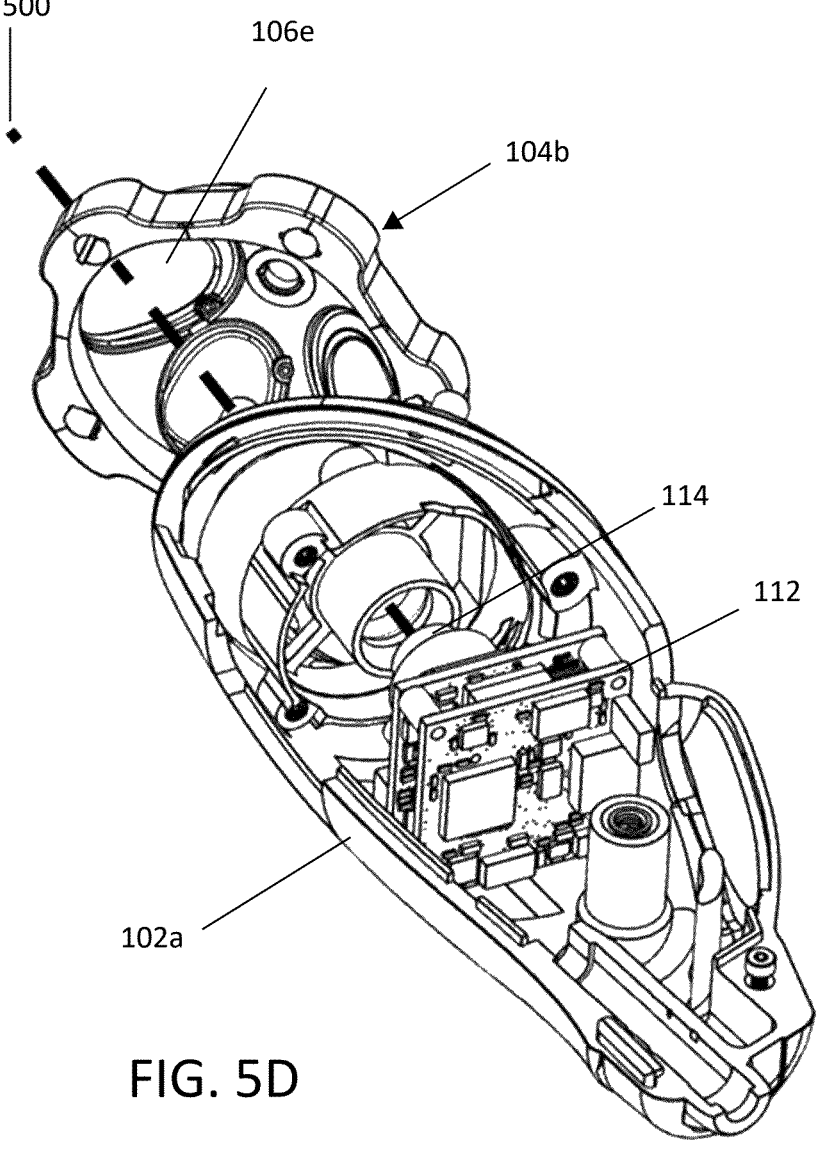
FIG. 5D is a perspective view of the main housing showing the alignment of the camera and aperture.
Figures 6A, 6B, 6C, 6D:
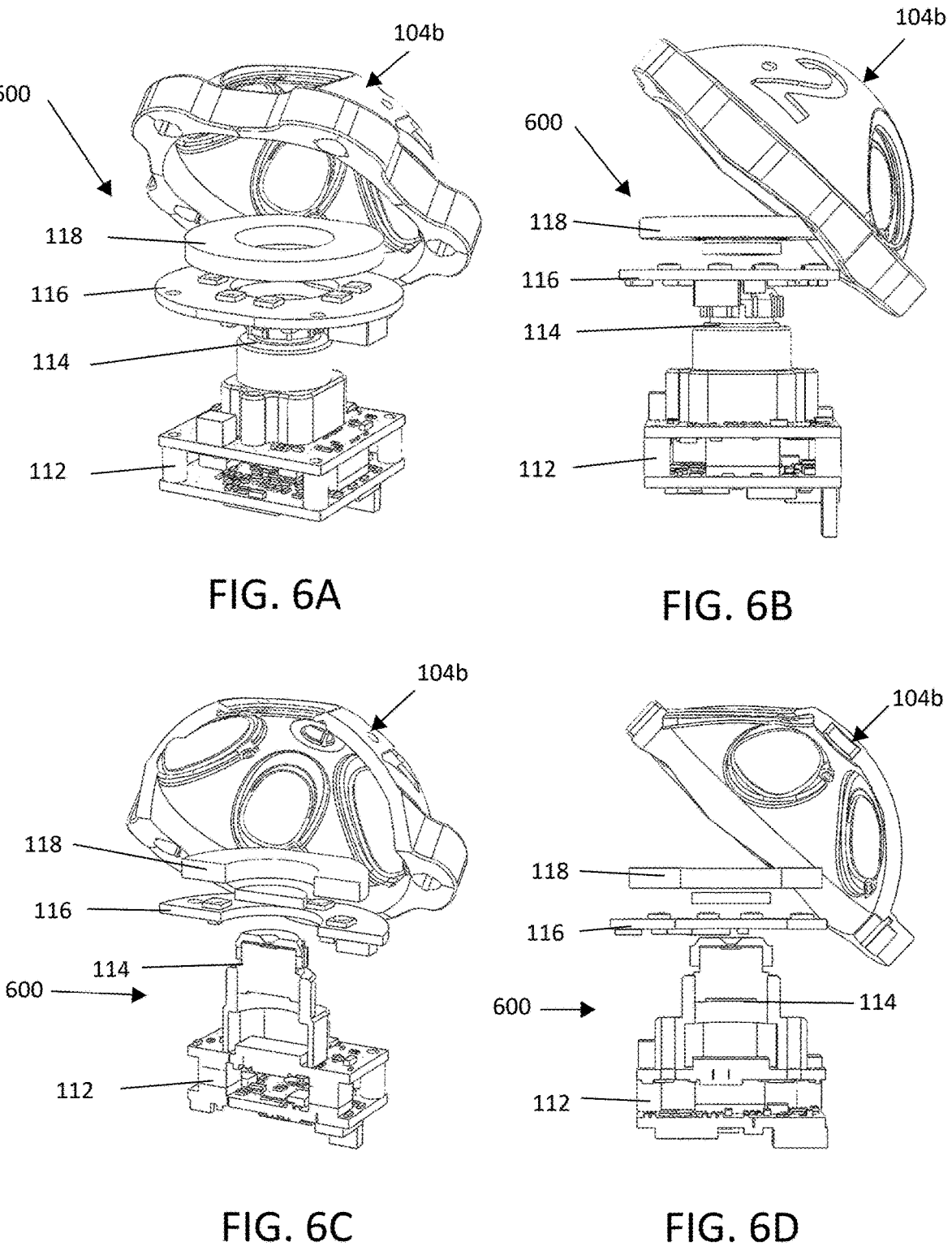
FIG. 6A is a perspective view of a fixed optical configuration with respect to the rotary aperture top.
FIG. 6B is a side view of the fixed optical configuration with respect to the rotary aperture top in FIG. 6A.
FIG. 6C is a perspective view of a longitudinal cross-sectional view of the fixed optical configuration with respect to the rotary aperture top in FIGS. 6A and 6B.
FIG. 6D is a side view of a longitudinal cross-sectional view of the fixed optical configuration with respect to the rotary aperture top in FIGS. 6A to 6C.

Releasable attachment between the hub 122 and the top 104a may be provided by a ball latching or snap-type mount, or in this particular embodiment, via a plurality of complementary arranged magnets on the hub 122 and rotary top 104a, as depicted in FIG. 1J. The plurality of magnets on the hub 122 may include a central magnet 144 and peripheral magnets 146a-e equally spaced around and from the central magnet 144. Complementary rotary top magnets, depicted in FIG. 4C, including a rotary top central magnet 148 and peripheral magnets 150a-e which are also equally spaced around and from the rotary top central magnet 148. Magnets are placed around the outer edge of the top to not only connect it to the housing but to also provide reproducible, discrete rotational positions to align each individual aperture at a precise location within the FOV of the camera. The central magnet pair 144, 148 on the rotation axis that centers the rotary top 104 acts like a shoulder screw or axle and stops the rotary top 104a from moving laterally. FIG. 1J shows a configuration with five pairs of magnets, with one set in the top (³⁄₁₆" diameter×³⁄₁₆" thick neodymium, 2.2 lbs. pull/magnet) and the second set in the main housing. (³⁄₁₆" diameter×¹⁄₈" thick neodymium, 1.6 lbs. pull/magnet). A typical pull strength with the six sets of magnets on the main housing has been tested to 5 lbs., therefore, the top will lock securely to the main body when the magnets are aligned. The top is approximately two inches in diameter, which will fit within the average grip size of an adult hand. The shear strength of the sets of magnets between the top and the main housing is <TBD pounds. At this level of force, the user can rotate the top with the thumb and pointer finger of the hand holding the device, as shown in FIG. 1I. The strength of the magnets are selected to firmly attach the top, but allow the shear forces to be easily overcome using the thumb and pointer finger to rotate the top to the next position. One capability that the magnetic configuration provides is the ability to easily remove a rotary top and replace it with another that has different sizes or configurations, thus allowing one base device to accommodate a wide range of sizes and body parts to scan. In some further variations, the interface between the rotary top and the rotary hub may optionally comprise complementary mechanical detents and projections to facilitate alignment of the apertures of the rotary top with the imaging aperture of the hub. The detents may be provided on the hub or the top, with the projections on the hub or the top, respectively. In other embodiments, a complementary central axle and central opening may be provided between the hub and top, to also facilitate alignment between the hub and top, and to potentially resist inadvertent separation between the hub and top. In some variations, the axle and opening may be in addition to or in lieu of the central magnets of the hub and top.

FIGS. 2A to 2C shows how the rotary top 104a is adjusted to access different aperture positions. When the magnets 146a-e, 150a-e are all aligned, the top 104a will be positioned with one of the apertures, e.g. aperture 106b in FIG. 2A, centrally aligned in the camera field of view (FOV), as indicated by the arrow. The magnets 146a-e, 150a-e are strong enough to hold the top 104a in location, but if a lateral force is applied, the magnetic attachment of the peripheral magnets 146a-e, 150a-e will rotationally separate (FIG. 2B) and allow for easy rotation until the magnets self-align again and automatically settle onto the next or closest alignment position, without the user needing to align the next aperture, e.g. aperture 106a, as shown in FIG. 2C. If, however, the rotation of the top 104a is stopped halfway or part way such that the magnet pairs 146a-e, 150a-e are not aligned, the top 104a can be easily removed and replaced with another top, e.g. tops 104b or 104c depicted in FIGS. 3B and 3C, respectively. The example in FIG. 2A to 2C shows five magnet pairs 146a-e, 150a-e, which creates five rotational positions. In other embodiment more or fewer magnet pairs may be provided, resulting in a larger or smaller number of rotational positions. A five-position top is a balance between maximizing the number of positions and the diameter of the device. The position with the indicia 138a may be used as a storage position to block debris from contacting the camera aperture or window. As the number of spots increases, the diameter of the top must increase to fit the apertures. The current design has a diameter that fits well within the grip diameter of an adult. The size of the apertures impacts the required diameter also and a top with only the smaller apertures could have more than five positions without increasing the diameter and single-hand usability of the device. A six or seven position top may be used without increasing the diameter at all if the apertures were small enough to fit.

Figures 2D, 2E:
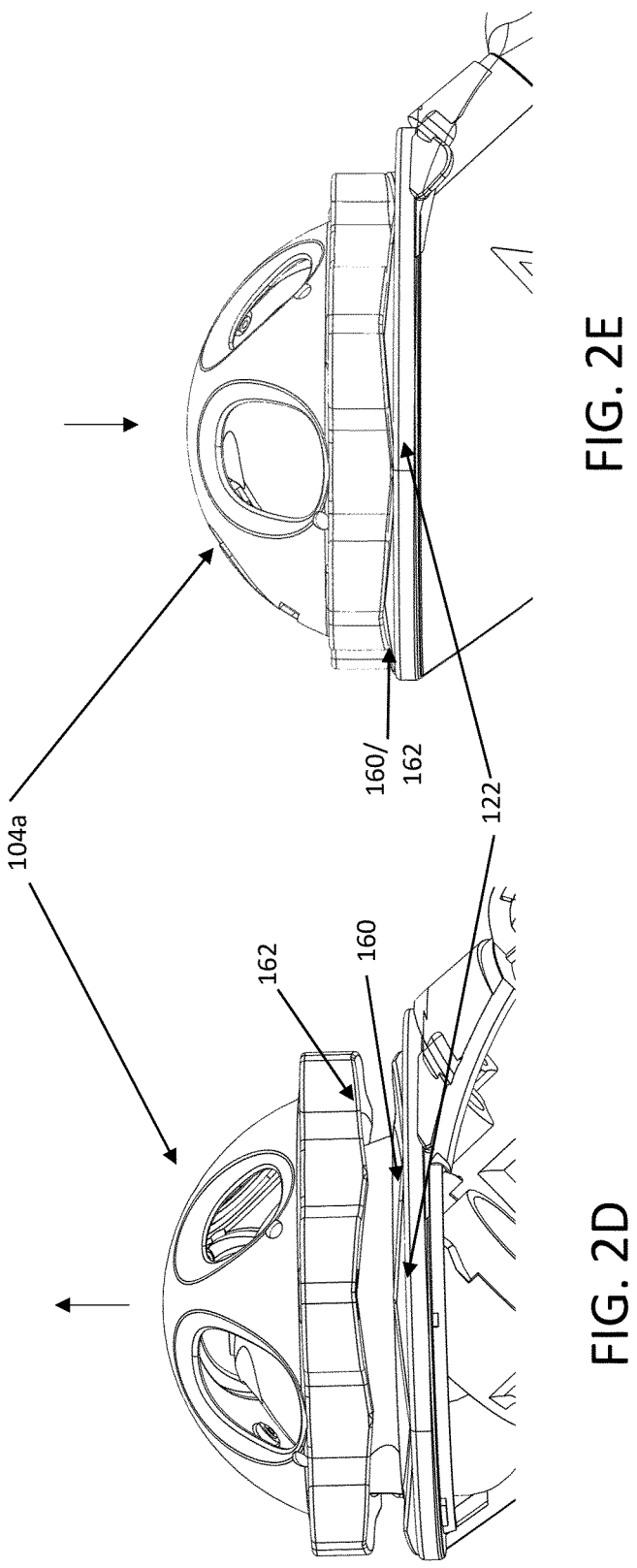
FIGS. 2D and 2E are side-elevational views of the device, illustrating the peripheral interface between the hub and rotary top, with the rotary top partially and fully seated positions, respectively.

To further facilitate the alignment of the rotary top 104a with the hub 122, or to otherwise bias a rotary top 104a toward an alignment position between the hub magnets 146a-e and rotary top magnets 150a-e, the rotary top 104a and the hub 122 may comprise complementary undulating surfaces or alternating angled ramp surfaces 160, 162, as depicted in FIGS. 2D and 2E, such that when the rotary top 104a is placed onto the hub 122, the attraction between the center magnets 144, 148a of the hub 122 and top 104a will attempt to minimize the gap distance between the center magnets 144, 148a (depicted in FIGS. 1J and 4C) and the top 104a. The undulating or alternating ramp surfaces 160, 162 will bias the top 104a to slide and rotate to minimize the gap distance, which in turn will bring the rotary top 104a into a position where the peripheral magnets 150a-e are closer to the peripheral magnets 146a-e of the hub 122a, to bring the rotary top 104a into full alignment. The undulating surface or alternating ramp surface 160 of the hub 122 may be located on a ring-like or annular surface 164 surrounding the center dome 166 of the hub 122, where the peripheral hub magnets 146a-e are located. Together, the magnets and the undulating surfaces facilitate selective alignment of the apertures 106a-e of the top 104a with the imaging aperture 167 of the hub 122. The corresponding undulating surface or alternating ramp surface 162 of the rotary top 104a may be located along the inferior surfaces of the flanges 140a-e and/or inferior surfaces of the rotary top 104a adjacent to the recesses 142a-e.

The self-alignment of the multiple magnets provides the primary method of alignment for the aperture centered on the camera FOV. The main housing and tops are designed so that the paired magnets will be close to each other without touching. This helps reduce the strength of these magnets and allow the user to easily rotate the top to the next position. In order to provide additional accuracy to the alignment, the housing and the rotary dial have interlocking features between the top and housing to further assist in keeping the rotational alignment of the top with the main housing accurate and reproducible.

When being used for newborns and infants, the device size and rotary top magnetic design assists the biometrician in collecting the fingerprints. For adult-only systems, the subject can interact with the device. For infants, the device must be brought to the subject and the biometrician will need to align the finger of the subject with one hand, and user their second hand for interacting with the device. Being able to hold the subject and perform all the functions of the device (e.g. rotate the top to get the best aperture size for that specific finger without letting go of the subject and triggering the image collection).

To use the fingerprinter over a wide age range, i.e. newborns, infants, children, and adults, the device needs to be configured to properly support fingers of different sizes. This is accomplished by having different sized apertures to support a variety of different finger sizes. If the aperture is too small, then the area scanned will result in not enough fingerprint minutiae visible to be detected for accurate analysis and if too large, the finger may fall into the device and not sit flat on the image plane and will allow external light to be let into the sample chamber. While scanning each individual finger on the subject, an appropriately sized aperture provides 1) support for the finger, 2) allows the finger to be viewed unobstructed by the camera, 3) it sets the position of the finger within the fixed focus range of the optical system, 4) sets the finger at a known distance with a known optical resolution, and 5) rejects external light sources from reaching the camera.

Figure 9A:
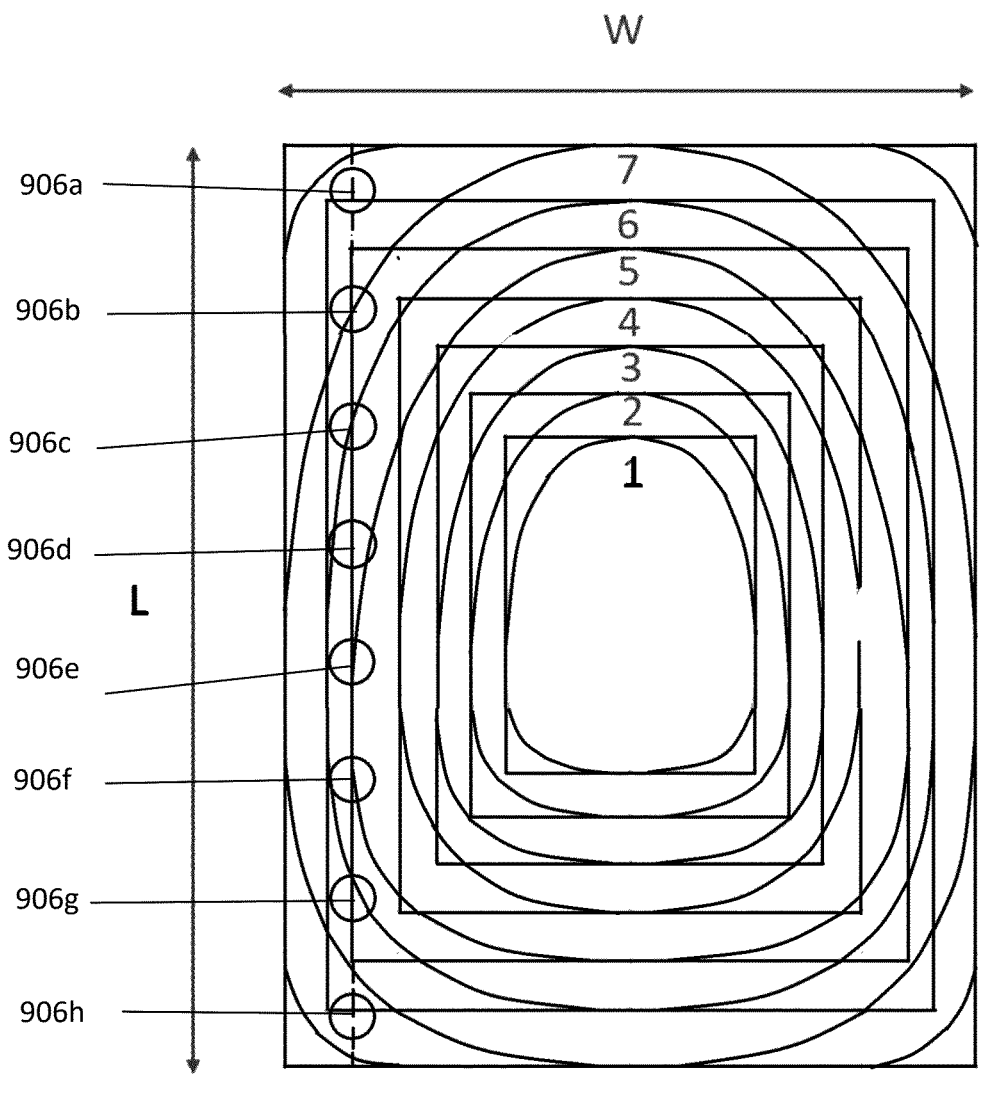
FIG. 9A is a schematic overlay outline of the seven finger apertures.
Figure 9B:
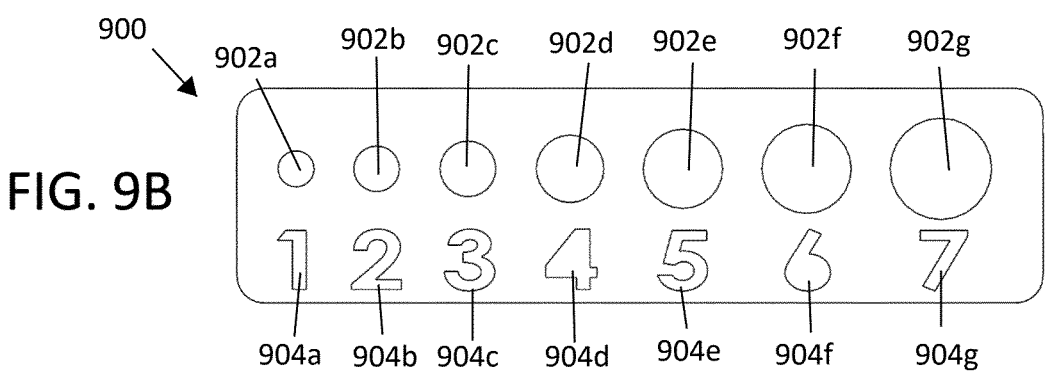
FIG. 9B shows a top view of finger selector guide.
Figure 15B:
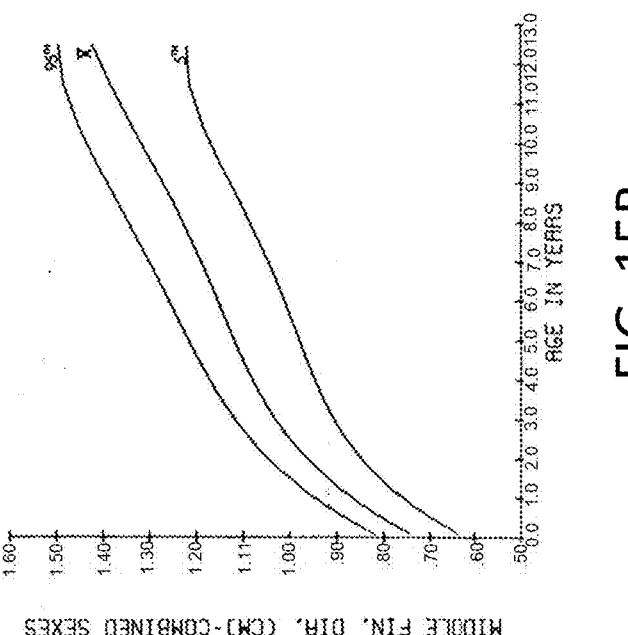
FIG. 15B shows data on middle finger size vs age.
Figure 15A:
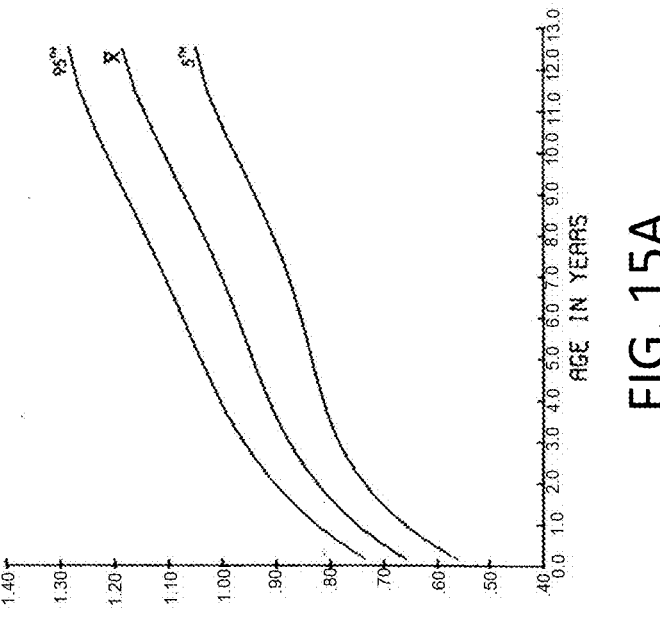
FIG. 15A shows data on little finger size vs age.

FIG. 9A is a schematic depicting the outlines of seven apertures 1, 2, 3, 4, 5, 6, 7 that span a finger size range that can be used from newborns through adults, with each aperture positioned at a common center. Table 1 lists the lengths and widths of the apertures, are sized proportionally to span between the smallest diameter for a newborn's little finger (FIG. 15A) and the size of the middle finger of a teen/adult, when the finger is fully grown (FIG. 15B). FIG. 15A is a data graph depicting the average, 5th percentile and 95th percentile ranges of the diameter (or width) of the fifth or little finger for a newborn can be as small as 5 mm and will increase up to 13 mm at the age of thirteen. Similarly, FIG. 15B shows the sizes for the third or middle finger width vary from 6 mm to 15 mm over the same age ranges, from anthropometric data disclosed in the Physical Characteristics of Children report by the Highway Safety Research Institute at the University of Michigan (UM-HSRI-BI-75-5), Final Report (May 31, 1975).

TABLE 1

| Aperture | Length (mm) | Width (mm) |
|----------|-------------|------------|
| #1 | 7.4 | 5.5 |
| #2 | 9.35 | 7 |
| #3 | 11.4 | 8.5 |
| #4 | 13.5 | 10 |
| #5 | 15.7 | 12.25 |
| #6 | 17.85 | 13.4 |
| #7 | 20.3 | 15.25 |

These sizes have been chosen to span this range in seven steps, but any other dimensions or combination of dimensions can be used for a particular application. A ruler 900, which may comprise cardboard or a hard polymer, may be provided with serially arranged apertures 902*a-g* and corresponding indicia 904*a-g* to facilitate sizing of the desired aperture for a particular subject's finger, whereby the aperture 902*a-g* is selected to support the maximum finger width without the finger passing through the aperture 902*a-g*. Each of these apertures 902*a-g* have a diameter corresponding the widths recited in the table above of 5.5 mm, 7 mm, 8.5 mm, 10 mm, 12.25 mm, 13.4 mm and 15.25 mm. In other variations, aperture widths may span a range of 5 to 16 mm, 4 to 18 mm or 3 to 20 mm and may be provided using 3, 4, 5, 6, 7, 8, 9, 10, 11 or 12 apertures. Although the exemplary indicia 904*a-g* in ruler 900 comprises numerals, letters or other symbols may be used and may correspond to the indicia provided on the rotary tops 104*a-c* adjacent to each of the apertures 106*a*-I or rotary top indicia 138*a-c*.

Figures 3A, 3B, 3C:
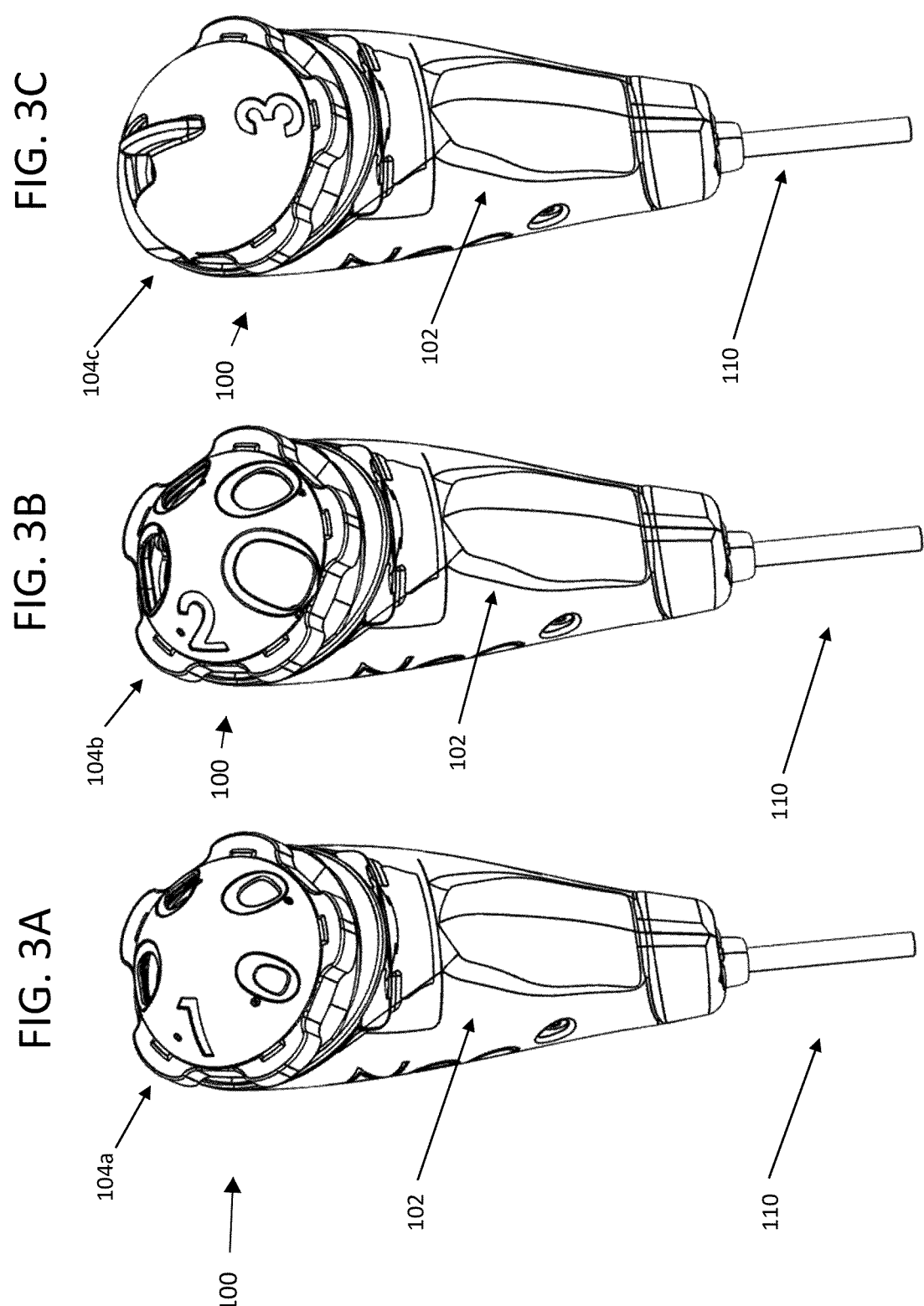
FIGS. 3A to 3C are rear perspective views of a fingerprint capture device attached to different rotary aperture tops.

FIGS. 3A to 3C show three different examples where the device 100 is configured or provided with a series of rotary tops 104*a-c* configured with a range of different aperture sizes for a specific application. In the set of apertures provided in these tops 104*a-c*, the apertures are each a different size, but in other variations, there may be overlapping size ranges between the different tops. FIG. 3A shows a top 104*a* installed on the device 100 that is intended for newborns and children, and contains apertures #1, #2, #3 and #4 from Table 1, along with a closed position marked by indicia 138*a*. This top 104*a* is also shown in FIGS. 4A, 4B, 4G and 4J. FIG. 3B shows a top 104*b* installed on the device 100 that is intended for adolescent and adults with contains apertures #4, #5, #6 and #7 from Table 1, along with a closed position by indicia 138*b*. This top 104*b* is also shown in FIGS. 4C, 4D, 4H and 4K.

FIG. 3C shows an optional top 104*c* that is configured to be used to properly place the hand of a subject for scanning the palm pads just below the fingers, where the "fin" structure 168 on the top 104*c* is positioned at the top edge of the FOV of aperture 106*i* so that the interdigital folds (i.e. webbing) between two fingers can be placed to each side against it to align the hand and to image the palm pad. In this top design 104*c*, the aperture is completely open to image the largest area possible of the finger pads. A sloped, wider flange 140*k* may be provided adjacent to the aperture 106*i* to further support the hand or palm of the subject during image acquisition. This top 104*c* is also shown in FIGS. 4E, 4F, 4I and 4L. The inner edges of apertures 106*a-h* may be sharp or angled, or may comprise a rounded edge. It is postulated that a rounded edge may reduce light shadows near where the imaged finger contacts the inner edges of the apertures 106*a-h*, by allowing more direct or indirect light at the inner edge.

The location of minutiae on the finger is within an area much like the shape of the apertures 1 to 7 shown in FIG. 9A, which comprise a generally oval or ovoid shape with a smaller distal end and a larger base. The shape of the apertures 106*a-h* on the tops 104*a*, 104*b* may be configured to keep the most minutiae exposed but also to support the finger. A rectangular aperture does not support the finger as well since the tip of the finger is often smaller than the knuckle area. The shape three dimensional shape of the aperture mimics the shape of the rounded shape of the finger, so that the finger is supported with an edge that conforms to the finger surface. FIGS. 4A to 4D and FIGS. 4G to 4K show that the shape of the apertures 106*a-h* mimics the shape of the finger, comprising the generally oval or ovoid shape with a smaller distal end and a larger base and with the dimensions recited in Table 1. Each aperture 106*a-h* is configured with a distance from the camera that will generally place the middle of the aperture and thus the finger (center being from the fingerprint to the fingernail) at a desired focus. Fingers are all different shapes and sizes, so this is a general guide and positions of the actual finger will vary. The device can image over a wide depth range and will have good focus over a 10 mm below the aperture up to above the aperture to keep the fingerprint in focus.

The main housing 102 has several features that simplify fabrication and ensure that the optical alignment between the camera and the finger placement is stable and consistent between each device. The main housing 102 may comprise a main shell 102*a* and a shell cover 102*b*, where the main shell 102*a* may be a single part that is printed, cast or machined, and containing relatively more alignment and retention features compared to the shell cover 102*b*. By using a single part for the main shell 102*a*, the dimensions can be controlled more precisely then when multiple parts are used for the different functions, which may provide greater precision and reproducibility when placing internal components and to achieve the desired camera alignment.

As illustrated in FIGS. 5A to 5D, the main shell 102*a* comprises features that support the optical components, including a camera assembly 112 with an integrated lens, a camera mount 170, an LED PCB 116 with an optical diffuser, so that these components are all aligned sufficiently along the optical centerline 500 and through the imaging aperture 167 of the rotation hub 122 and the attached rotary top 104*b*. The main shell 102 may also has features that block scattered LED light from reaching the camera and it also blocks any external light sources from leaking into the device through the other apertures on the top, including light blocking internal walls and light absorbing or diffusing paint. The rotation hub 122 has a concave rounded chamber 172 underneath the hub 122 that assists in homogenizing the light for diffuse illumination.

By fixing all of the optical components and fixing the position of the finger, the optical resolution, field of view, light source intensity and spectral content are all kept consistent or variations may be reduced, and the finger can be held at the location of desired focus for each image collection. In addition, when the finger is placed on the aperture, the disclosed design reduces external sources of light which may obscure the finger and may keep the (non-finger) background portions of the image consistent. The result of using all these features is the collection of an image with increased quality and contrast. FIGS. 6A through 6D are views of the sub assembly 600 with an exemplary top 104b show the alignment of the various optical components 112, 114, 116, 118 and each position is set by the main shell 102a. FIGS. 7A through 7D show additional views where the pinhole aperture structure 700 and a pinhole aperture support 702 has been added to the top of the standard f/3 lens 114 to increase the f/# to f/10 so that the depth of focus of the camera assembly 112 can be increased to be able to obtain sharp images of the finger surface even though the finger is curved, with different portions of the finger at different distance to the camera assembly 112.

For the camera assembly 112, the main shell 102a provides x-y-z alignment to a high enough accuracy so that only small alignment adjustments are required. Variations in the camera assembly 112, however, may benefit from a finer angular alignment. For example, the camera chip, lens mount, lens, aperture and camera mount will not always have the exact same relative positions for every camera assembly 112, which may result in the center of the camera FOV varying between each camera/optics subassembly. To correct this, slight angular alignment and/or Z-axis translational adjustment of each camera assembly may be performed to improve alignment and/or depth of field location.

Figures 8A, 8B, 8C:
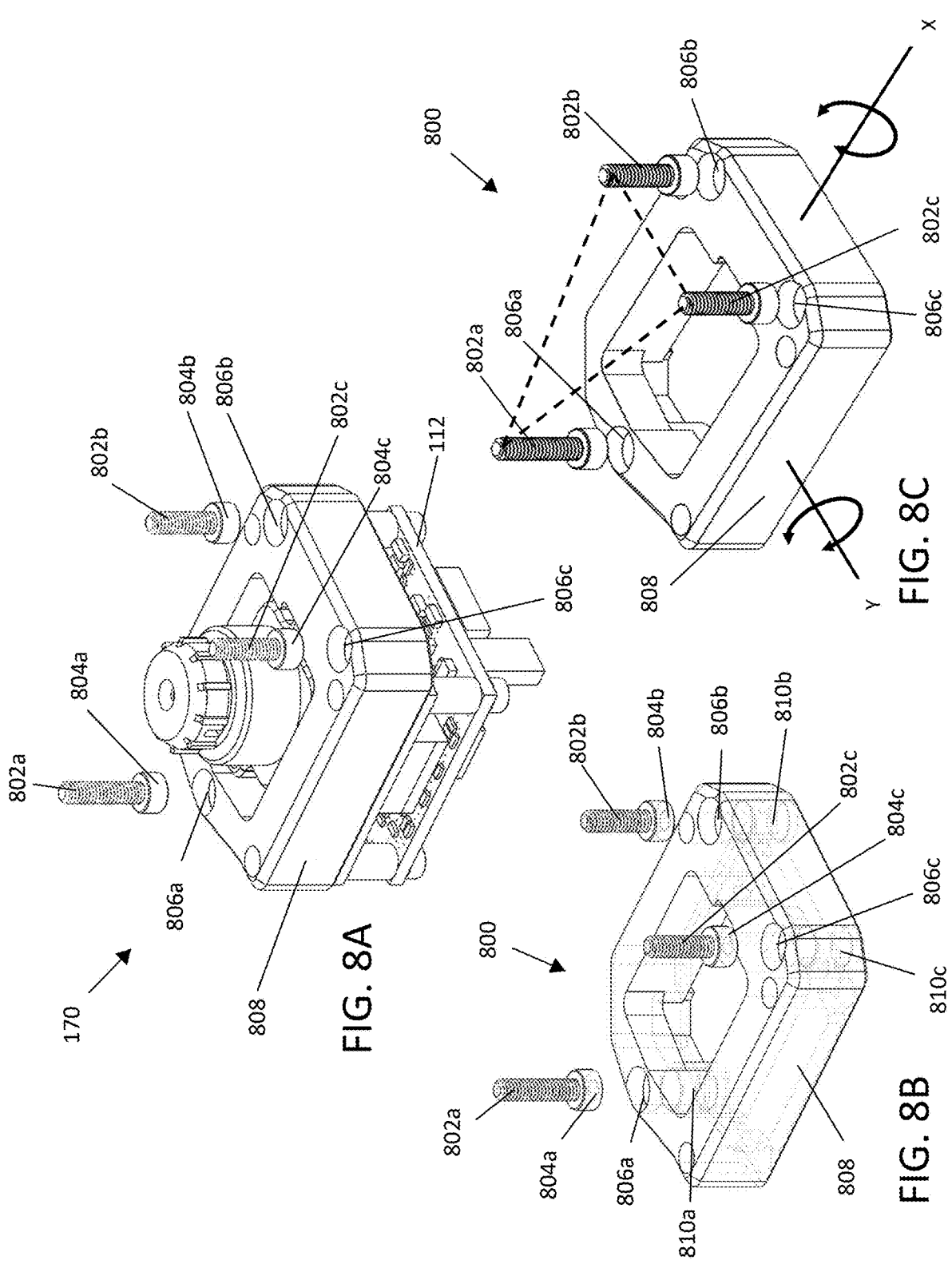
FIG. 8A shows a perspective view of a camera alignment configuration.
FIG. 8B shows perspective with visible hidden lines and magnets placement in camera alignment configuration shown in FIG. 8A.
FIG. 8C shows a perspective view and variable alignment angles of camera alignment configuration shown in FIGS. 8A and 8B.

Fine alignment and securing the position of a camera assembly in a small, handheld device may be difficult to achieve, due to space constraints. In some examples, a 3-point magnetic kinematic camera mount and alignment assembly 170, depicted in FIGS. 8A to 8C, may be provided to allow for adjustment of the camera assembly 112 to center the lens aperture in the FOV and to permanently fix the camera pointing angle to retain alignment. Kinematic mounts are typically designed for components that need to be repetitively removed and replaced with a high degree of positional and angular reproducibility. For the disclosed devices, the camera assembly may be aligned once and then securely retain alignment for long term use. The alignment assembly 170 comprises three adjustable magnetic screws 802a-c that attach to corresponding internal locations in the main housing whose heads 804a-c will insert into the retention 802a cavities 806a-c of the alignment frame 808 and be secured magnetically. The general alignment of the camera assembly 112 may be fixed with standard alignment features and structures built into the device housing. Fine adjustment of the camera FOV onto the apertures of the hub and rotary top may be accomplished by adjusting the heights of the three screws to alter the pointing angle of the camera. FIG. 8A shows the camera assembly 112 in the alignment frame 808 of the camera mount assembly 170 and the three screws 802a-c used to align the angle of the camera assembly 112 relative to the device housing. FIG. 8B shows the configuration where the camera mount 170 contains three magnets 810a-c situated in a triangle, depicted in FIG. 8C, around the camera central axis within the frame 808, with each magnet 810a-c situated at the bottom of a cavity 806a-c. When in place, the screws 802a-c will magnetically attach to the magnets 810a-c and the angular position of the camera 112 is set by the depths of screws 802a-c. Adjustment of the screws 802a-c, as shown in FIG. 8C, will alter the pointing angle of the camera assembly 112, with adjustment of either of the screw 802a to modify the y-rotation and/or screws 802b-c along one edge of the frame 808 to modify the x-rotation. Thus, during alignment, the screws 802a-c may be adjusted to vary the pointing angle of the so that the center of the FOV with the center of the apertures of the hub and rotary. Translation is not required for this configuration because the initial alignment based upon the main housing features is adequate and only fine adjustment is needed, but in other variations, translation along the Z-axis may be accomplished via adjustment of all three screws 802a-c. This may improve the placement of the depth of field along the Z-axis to improve image focus and fix the extent of the FOV for a constant image resolution.

FIGS. 19A to 19D depict another embodiment of finger-print capture device 1900 that further comprises an optional optically transparent window structure or cover 1902 along the optical path or centerline 500 of the camera assembly 112. The other components of the device 1900 may be otherwise similarly provided and configured as with device 100 in FIGS. 1A to 1G, such as the aforementioned camera assembly 112, and the actuator 108, wired communication link or cable 110, lens, light PCB 116, diffuser, camera aperture, aperture support 154, and kinematic camera mount and alignment assembly 170, for example.

Figure 19A:
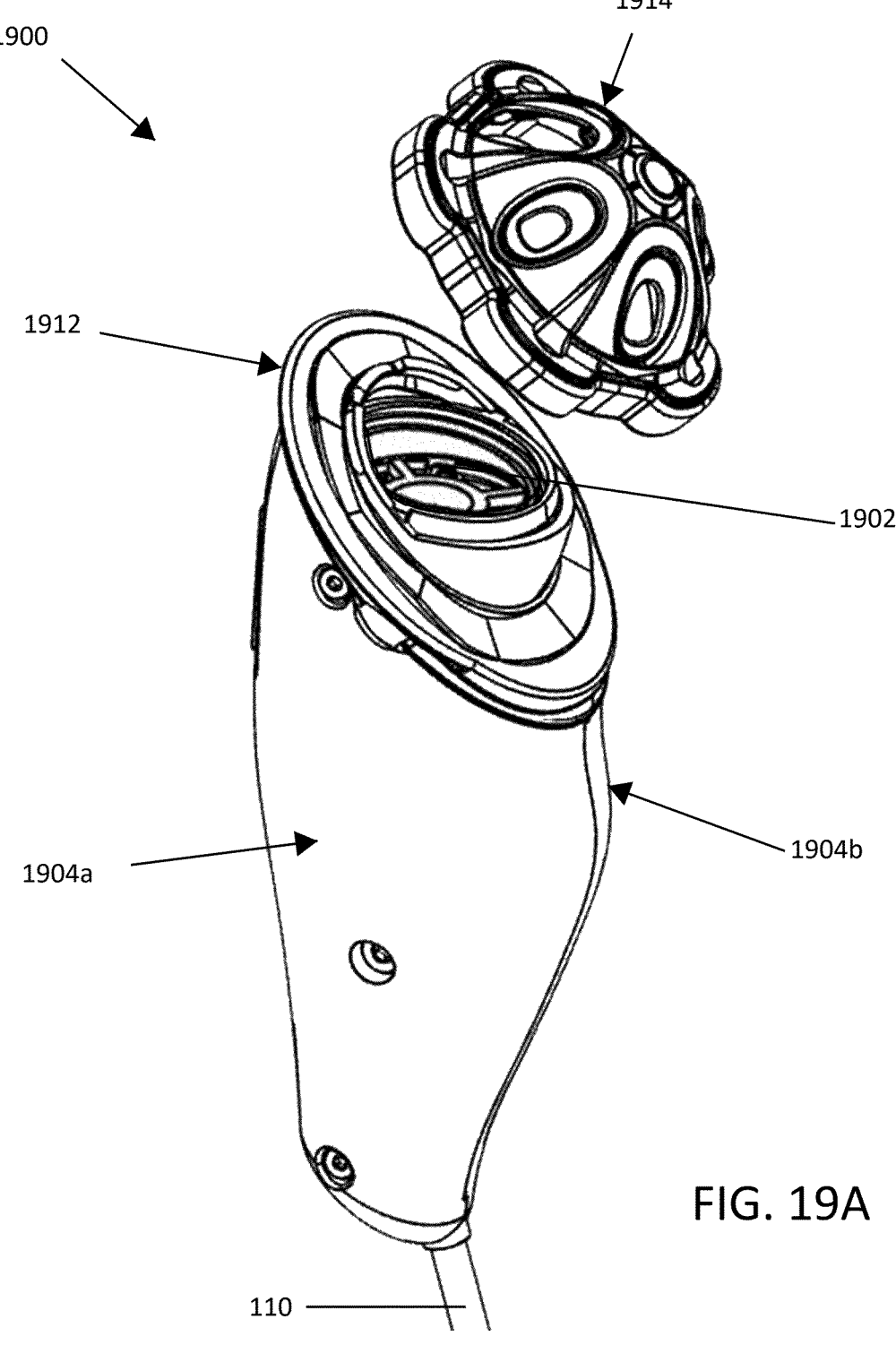
FIG. 19A is a perspective view of another embodiment of a fingerprint capture device with the rotary top separated from the main housing.
Figure 19B:
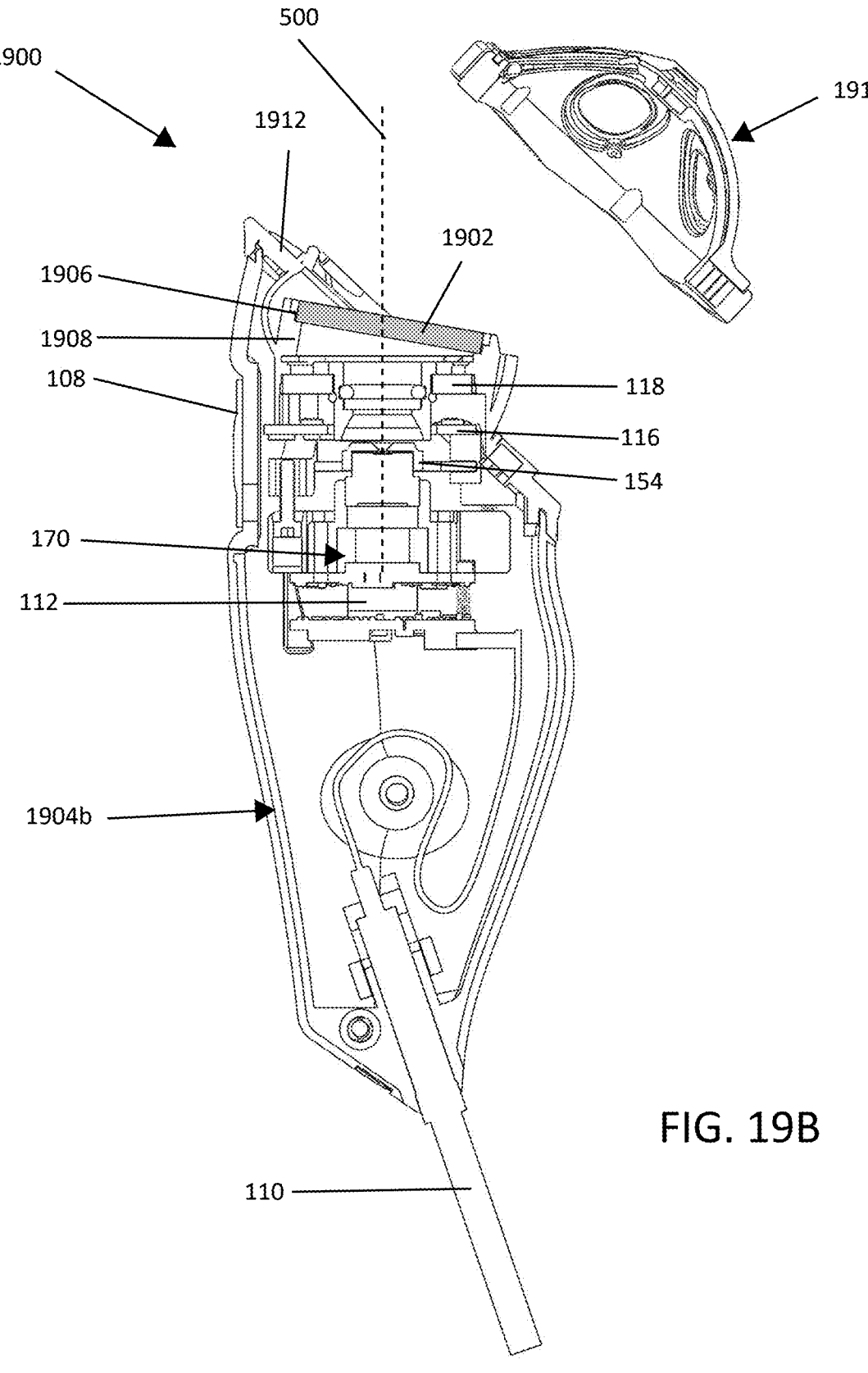
FIG. 19B is a longitudinal cross sectional detailed view of the superior region of the fingerprint capture device in FIG. 19A.
Figure 19C:
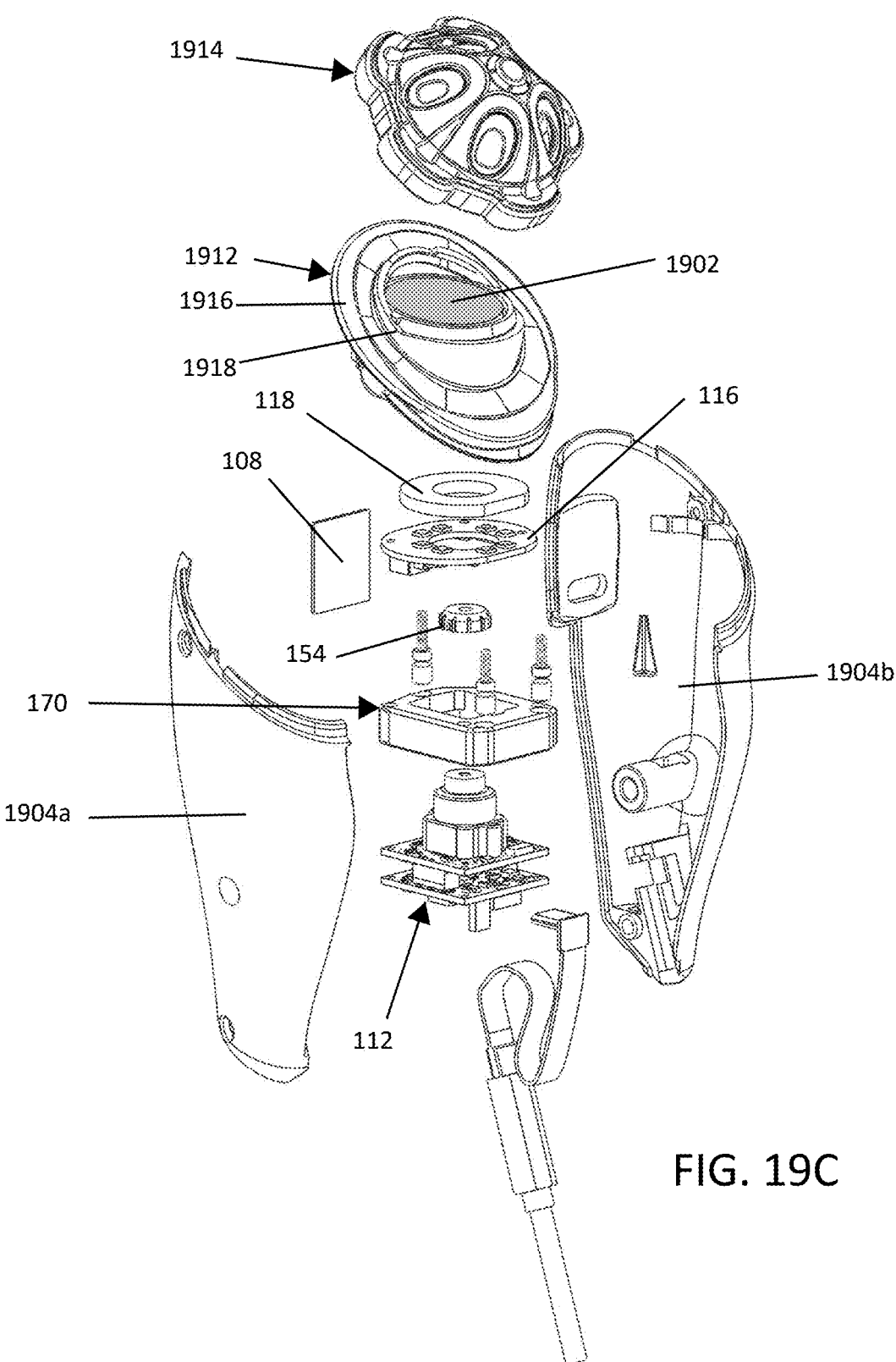
FIG. 19C is an exploded view of the exemplary components of the device in FIG. 19A.
Figure 19D:
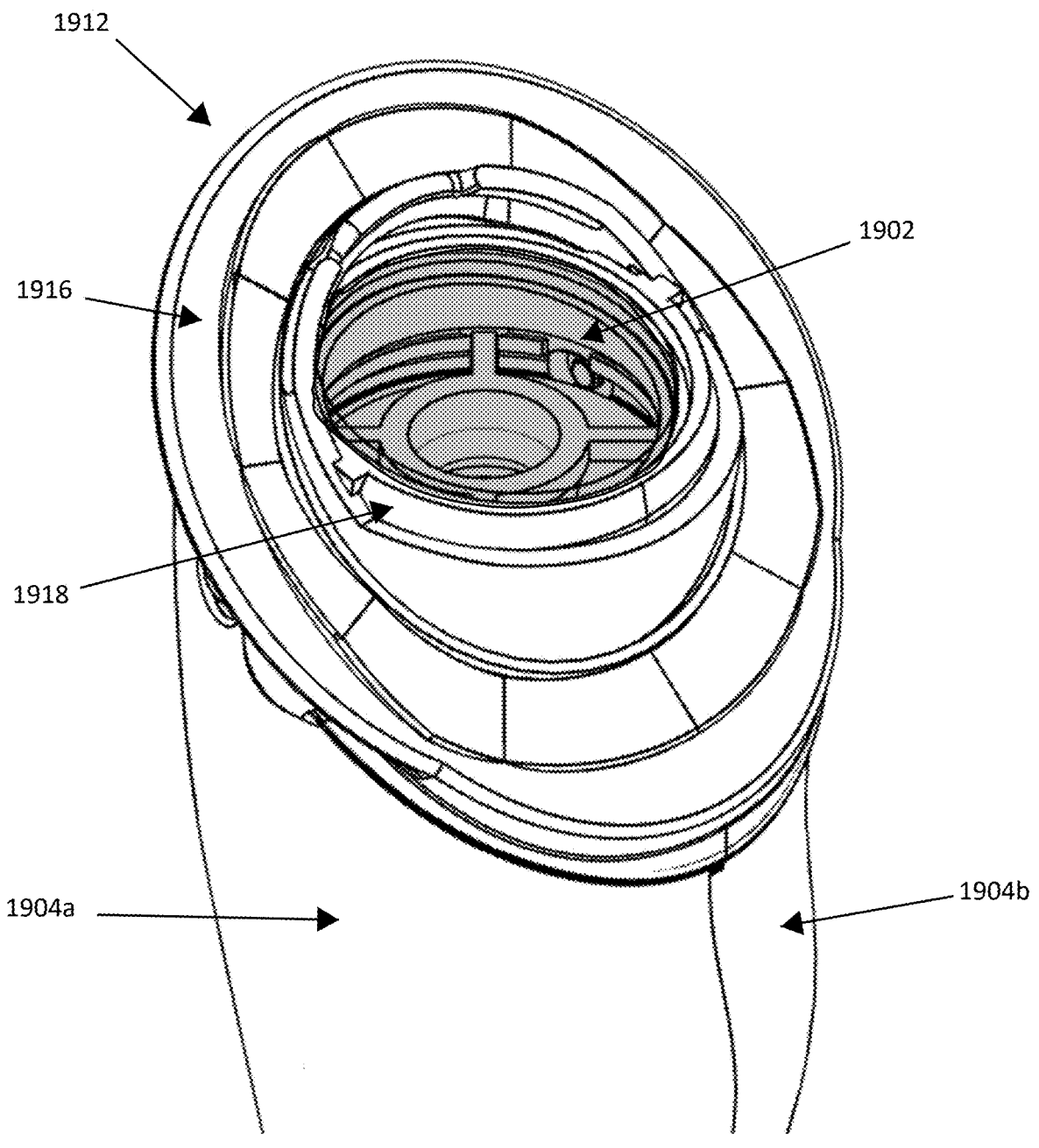
FIG. 19D is a perspective detailed view of the rotation hub and optical cover of the main housing in FIG. 19A.
Figure 19E:
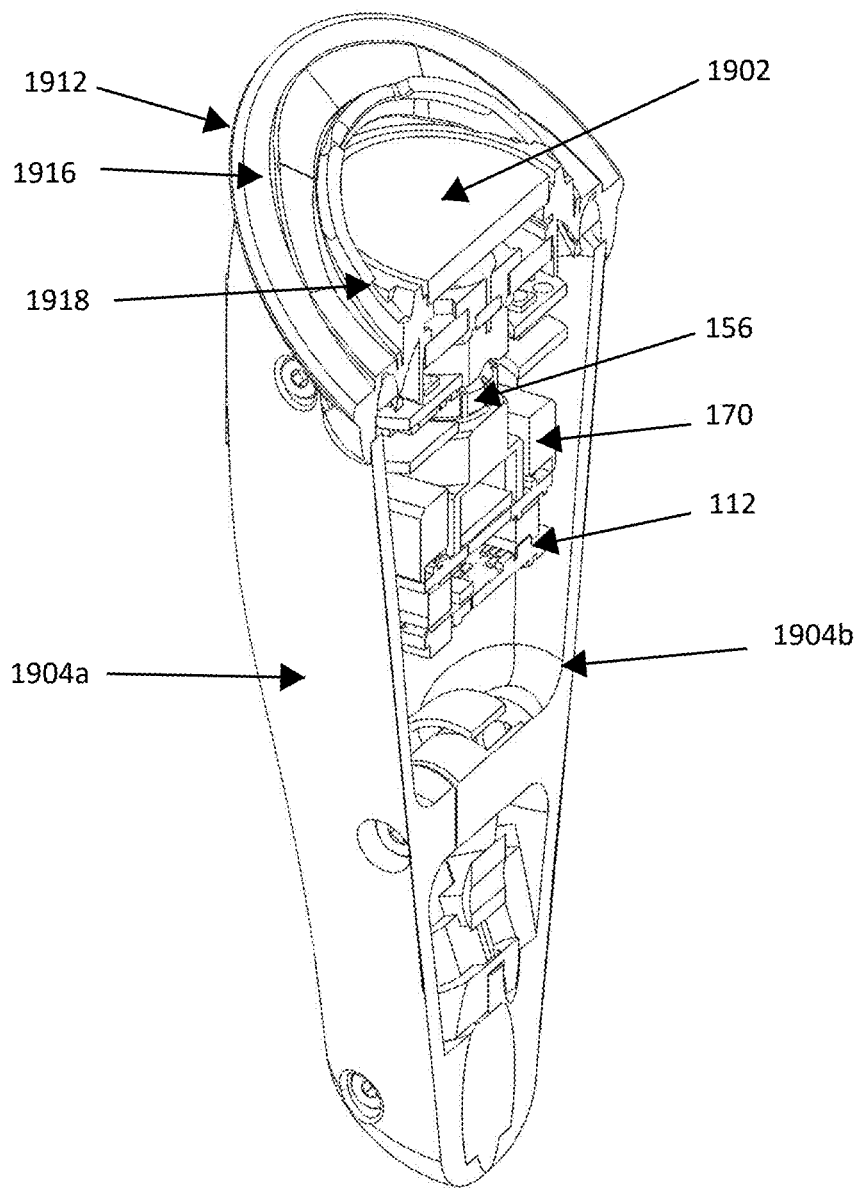
FIG. 19E is a perspective cross-sectional view through the main housing in FIG. 19A.

As depicted in FIGS. 19B and 19C, the optical cover 1902 may be attached to the rotary hub 1912, via a recess 1906. In other embodiments, however, the cover may be attached to main housing rather than the rotary hub, by an annular or circumferential recess of the housing. The recess 1906 may be provided on annular or circumferential flange or support 1908 of the hub 1912 to position the cover 1902 more superiorly for easy cleaning. As depicted in FIG. 19B, the recess 1906 or support 1908 need not have the same angular orientation as the rotation plane of the hub 1912, e.g. the cover 1902 may partially reside above and/or below the rotation plane of the hub 1912 as depicted in FIG. 19B. This difference may help reduce reflection artifacts from the light source and/or ambient light, during use. The cover 1902 may help to protect the camera assembly 112 from dust or other contaminants, which may help to maintain long-term image quality. The cover 1902 may comprise a polymeric material such as a polycarbonate or a glass. The cover 1902 may be glued to the recess or form a mechanical interfit with the recess 1906, and a rubber or other polymeric seal may be provided between the cover 1902 and the recess 1906 to enhance sealing and/or retention of the cover 1902 to the housing 1904a/b.

The cover 1902 may be configured with light filtering properties for various wavelength ranges and/or polarity. The cover 1902 may include one or more coatings on the external and/or internal surfaces, e.g. hydrophobic and/or oleophobic coatings to make the cover resistant to water and/or fingerprints, and/or scratch resistance, and/or anti-reflective properties, to minimize flare and/or ghosting. The cover 1902 may comprise a generally planar material, but in other variations, the cover 1902 may have a concavity and/or convexity in order to provide magnification and/or other lens characteristics. The lens characteristics may complement or substitute for any lenses provided in the camera assembly 112. In the embodiment depicted in FIGS. 19A to 19D, the cover 1902 comprises a planar material with a center or average thickness of 8 mm, using standard glass. In other variations, and based on the type of material and its strength, the cover 1902 may have a center or average thickness in the range of 1 mm to 10 mm, 1 mm to 8 mm, or 2 mm to 6 mm. The cover may have a diameter of 30 mm, or a diameter in the range of 5 mm to 50 mm, 10 mm to 40 mm, or 25 mm to 35 mm. The cover surface area may be 700 mm², but in other variations, the surface area may be in the range of 700 mm² to 900 mm², 600 mm² to 800 mm², or 650 mm² to 750 mm².

Figure 18:
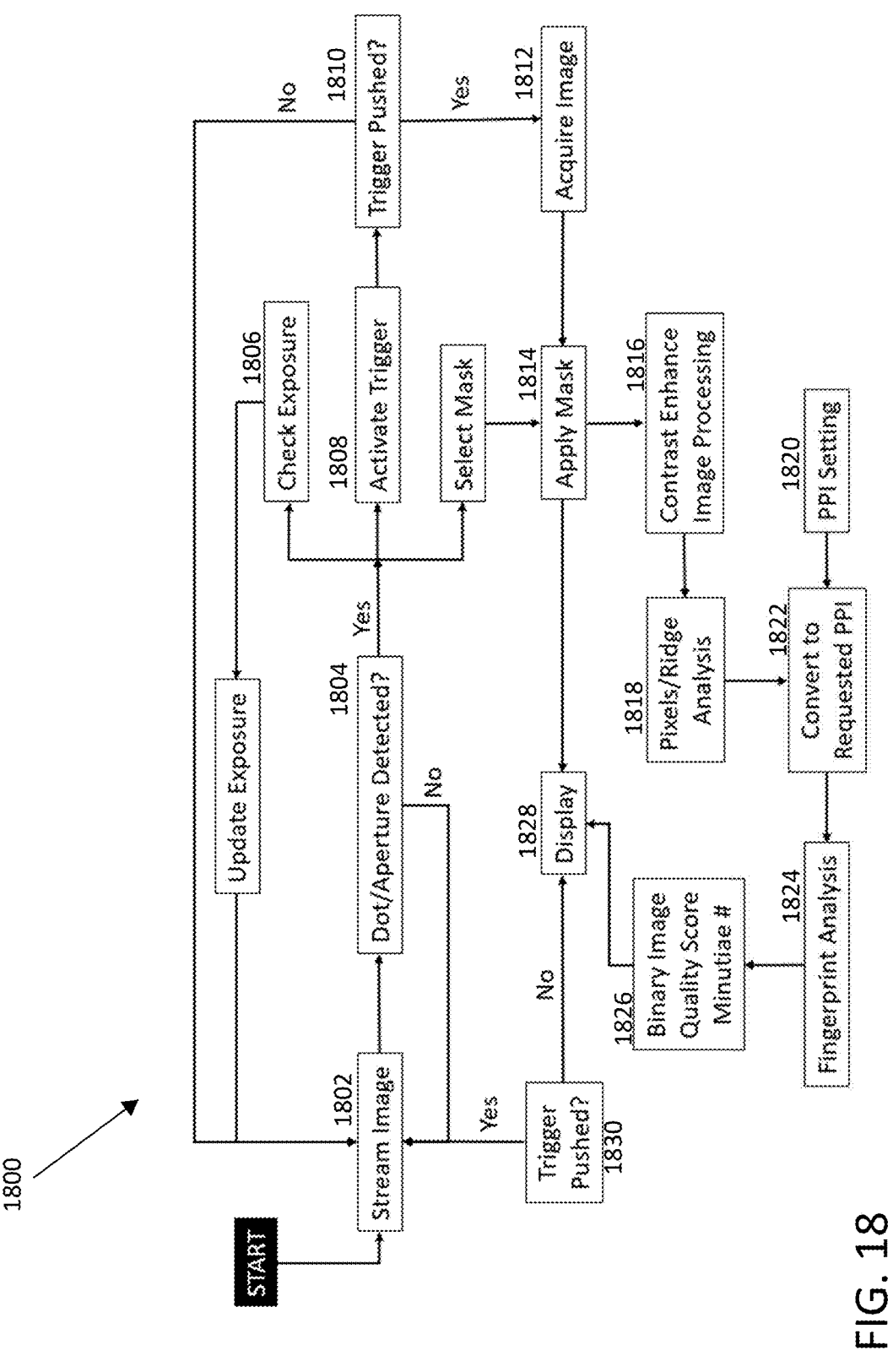
FIG. 18 is a flowchart of the system operation.

In the exemplary embodiment depicted in FIGS. 19A to 18D, the cover 1902 may be orientated at an angle of 11 degrees from the optical centerline 500 of the camera assembly 112. In other variations, the cover orientation angle may be in the range of 0 degrees to 45 degrees, 5 degrees to 30 degrees, or 10 degrees to 15 degrees from the optical centerline 500 of the camera assembly 112. The cover orientation angle relative to the plane of the rotation hub 1912 may be −30 degrees, but in other variations may be in the range of −45 degrees to +0 degrees, −40 degrees to −15 degrees, −35 degrees to −25 degrees, −30 degrees to +5 degrees, or −15 degrees to +0 degrees, for example.

Another optional feature of the fingerprint capture device 1900 is that the rotary hub 1912 may lack the center dome 166 of the rotary hub 122 that is depicted in FIG. 1J, and therefore also lack the center magnet 144. Instead, the rotary hub 1912 of device 1900 in FIGS. 19A to 19D may utilize the perimeter magnets (not shown in FIGS. 19A to 19D, but otherwise configured similarly to those in FIGS. 1A to 4L) of the rotary hub 1912 and rotary top 1914. While lacking a central dome, the rotary hub 1912 may still comprise an annular peripheral flange 1916 which the rotary top 1914 is seated on, and an inner projecting flange 1918 to be received by the inner cavity of the rotary top 1914. As depicted, the inner projecting flange 1918 may be comprise a variable or non-uniform projection height, as a result of the orientation angle of the cover 1902. As the rotary hub 1912 lacks a central dome, the rotary top need not have a central dome-like structure 1922, and may alternatively comprise a flat end cylindrical shape, frustoconical shape, or polygonal cross-sectional shape, for example.

The magnetic attachment also allows for easy removal of the camera assembly to adjust the three screws 802a-c and easy replacement to check alignment. Once aligned, the magnetic attraction between the magnets 810a-c if camera mount 170 and pedestal screws 802a-c will retain alignment of the camera long term without the need to secure the camera assembly 112 in any other way. This magnetic mount 170 also allows for the camera assembly 112 to be reproducibly removed for maintenance and reinserted without further alignment.

The kinematic fine alignment is useful to properly align the rotary top to the camera field-of-view. The alignment may facilitate any top fastened to the hub of the main housing to have the center of the field-of-view properly aligned with the aperture in place.

An accurate alignment of the camera with respect to the aperture may facilitate proper detection of what aperture the user has selected and has been placed in the FOV, and may reduce imaging processing requirements to correct imaging variations by providing physical reproducible alignment. To reduce complexity, the rotary tops may not have any positional sensors to detect what aperture is in place, and the camera may be used to detect what aperture is in place in real-time. In some variations, image processing can be used to detect the aperture in the camera FOV and may be used to identify which aperture is positioned, and the dimensions and other image characteristics may also be used to normalize or calibrate the camera assembly, the image on an image-by-image basis, and/or a per-subject basis. To indicate which aperture has been selected, different indicia or indicia locations may be provided on the interior surface of the rotary top to facilitate identification of the aperture positioned in the camera FOV. Such indicia may also be used to normalize or calibrate the camera assembly, the image on an image-by-image basis, and/or a per-subject basis. In some variations, a single white dot is positioned in a unique spot for each aperture, which may be identified easily and quickly with image analysis. Referring back to the schematic of FIG. 9A, the locations on the left of the dots 906a-h, one for each aperture 1 to 7. In this exemplary embodiment, the dots 906a-h are all aligned vertically but at different locations, which may simplify detection and may also help to confirm alignment of the corresponding apertures 1 to 7. There are eight unique apertures in the current configuration, including one for the closed position. More (or less) apertures and dots can be used and different areas of the camera FOV can be exploited.

Figures 11A, 11B, 11C:
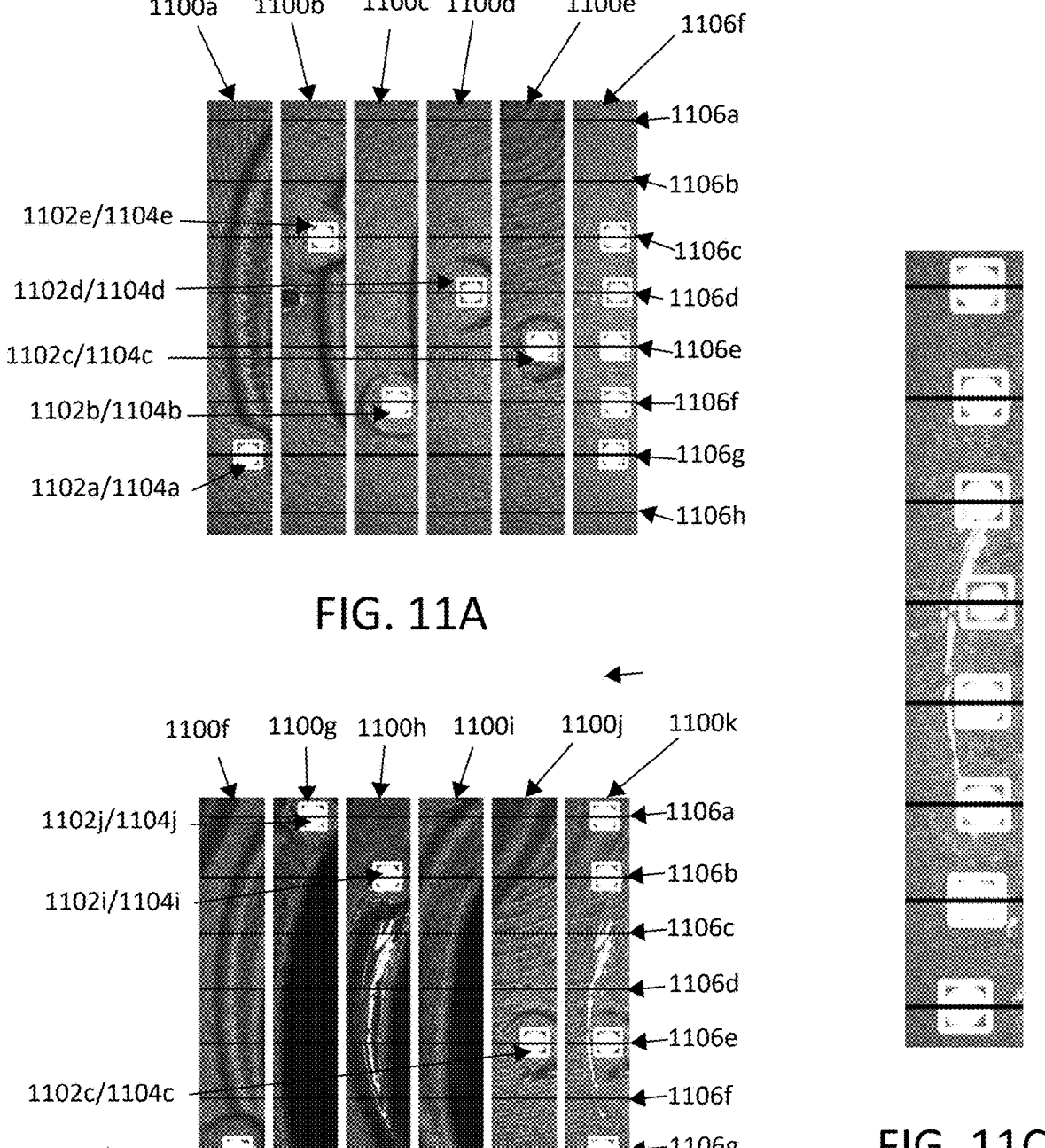
FIG. 11A show all the dots placement on the infant rotary aperture top.
FIG. 11B shows all the dots placement on the adult rotary aperture top.
FIG. 11C shows all the dots overlaid along the bounding box.

FIGS. 10A to 10C depict one exemplary top 1000a-c where each aperture 1002a-c or closed position has a hole or cavity 1004a-c placed at a unique location in the rotary tops 1000a-c, so that in the field of view resulting image 1006a-c in FIGS. 10D to 10F, a corresponding dot 1008a-c will result at along a vertical edge 1010a-c (or other location) of the corresponding image 1006a-c. In this particular example, the holes 1004a-c are filled with a white silicone to create white "dots" that can be optically detected. Other methods can be used where dots are painted onto the surface, the tops can be 3-D prints in multiple colors, or physical pins can be placed to produce a pattern to be detected. Images of the current configuration are shown in FIGS. 10D to 10F for three different apertures 1012a-c. An image processing algorithm that detects dots is used and is active within the dotted area 1014a-c of the image 1006a-c, so that a detection is made only when the magnets have engaged, and the top is in place. FIG. 11A depicts the dot detection area 1100a-e for selected apertures of the rotary tops 104a shown in FIGS. 4A to 4D. Each of the five vertical images 1100a-e shows the dot 1102a-e detected by the image processing algorithm for each aperture 106a-e and the closed position and is indicated by placing a detection box 1104a-e around it. The position along the vertical axis of the image 1100a-e determines what aperture has been selected. The black horizontal lines 1106a-h indicate the expected potential positions of the dots for detection. The rightmost image 1100f shows all of the dots 1102a-e and boxes 1104a-e of that top overlaid onto a single image to illustrate that they are separated and distinguishable from each other. FIG. 11B shows the imaging data for the top 104b shown in FIGS. 4E to 4H, which has a different combination of apertures 106e-h and corresponding dot locations, resulting in images 1100f-j with dots and boxes 1102a/c/f/i/j and 1102b/c/f/i/j. In this particular embodiment, the smaller aperture on top 104b is identical in size to the largest aperture on top 104a, and therefore share the same dot location, as do both of their closed positions. Image 1100k depicts all of the dots and boxes 1102 a/c/f/i/j, 1104 b/c/f/i/j, respectively. FIG. 11C shows all the dots and the positions of detection for the 8 positions for these two sets of tops 104a, 104b, which include three unique apertures on the smaller top 104a corresponding to dots 1102e at location 1106c, dot 1102d at location 1106d, and dot 1102b at location 1106f, three unique apertures on the larger top 104b, corresponding to dot 1102f at location 1106h, dot 1102i at location 1106b, dot 1102j at location 1106a, and identical apertures 1102a at location 1106g, which is the largest aperture on top 104a and the smallest aperture on top 104b, and closed positions on each top 104a and 104b which have the same dot 1102c at location 1106e. In use, the user can then take either top 104a, 104b and place it onto the device 100 and it will detect the aperture 106a-h in place.

The dot locations for the closed positions of each different top can be the same or different, so that the top attached to the device may be detected even when in the closed position.

Aside from identifying the rotary position and the aperture of the top, the optical detection of the dot is used in a number of ways to support the user in the collection of the fingerprints. One way the dot detection is use is to signify that the device is ready for collection. Once a dot is detected in the search box, the software control system will enable the ability to acquire an image by pressing the trigger on the device or via software, thus minimizing the collection of errant images when an aperture is not properly in place.

Figures 16A, 16B, 16C, 16D:
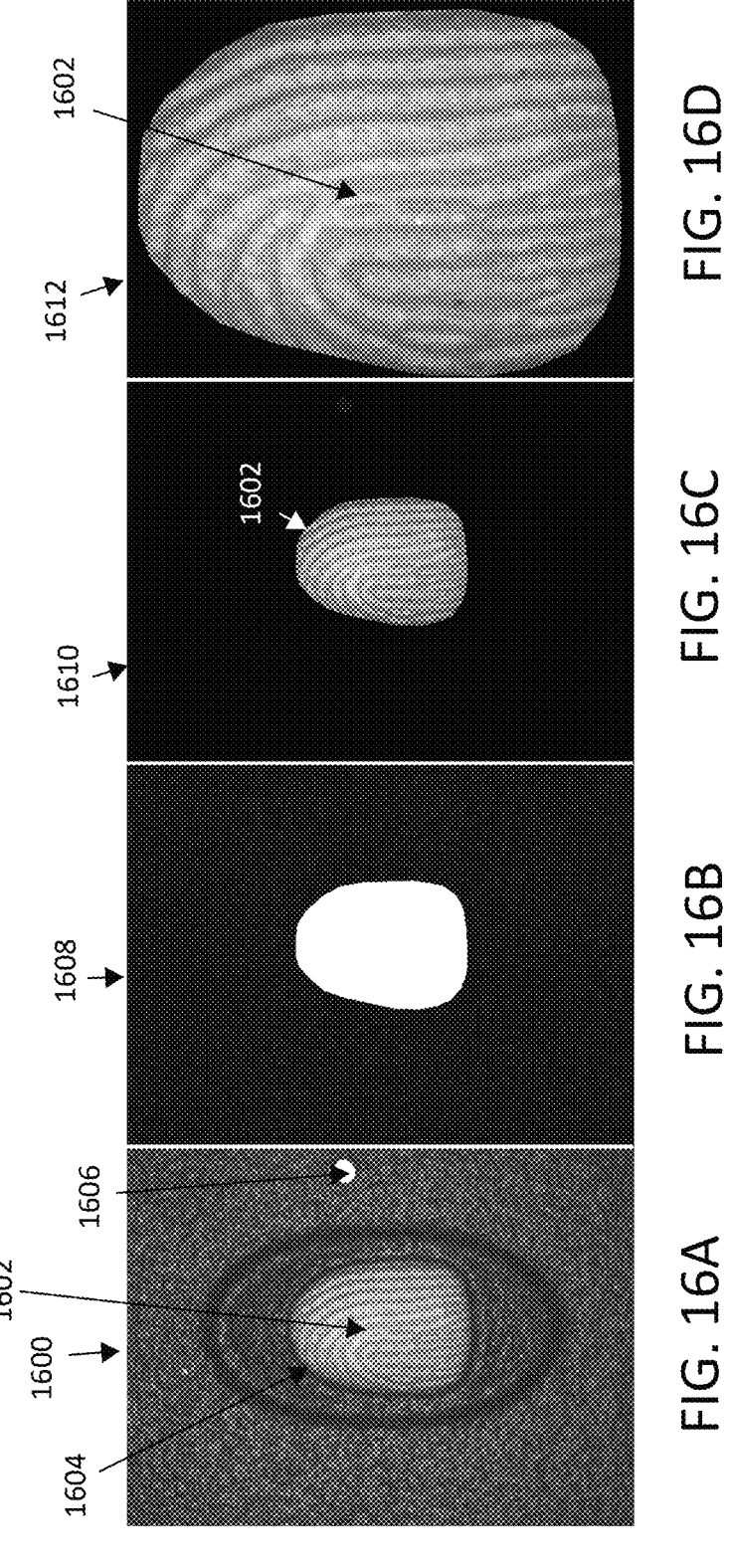
FIG. 16A shows a raw image of a finger.
FIG. 16B shows the binary mask for that aperture used.
FIG. 16C shows the image of the finger after applying the mask to the raw image.
FIG. 16D shows a zoomed in image of the finger as it would be presented to the user.

Another aspect of identifying the aperture in place is that the resultant images can be cropped with a binary mask specifically designed for a particular aperture. This requires substantially less computing power to apply compared to other image analysis and correction algorithms. Upon collection the specific aperture mask is used to remove the non-finger background and speed up processing by reducing the pixel count of the image. This position of the binary mask is fixed if the dot is detected precisely at the correct location. If required, the coordinates of the dots can be detected and the mask adjusted translationally and/or proportionally if the aperture is slightly misplaced. An example of this is shown FIG. 16A to 16D. FIG. 16A shows a raw image 1600 of a finger 1602 located in an aperture 1604, containing the indicia dot 1606, FIG. 16B shows the binary mask 1608 for that aperture 1604 used, FIG. 16C shows the resulting image 1610 of the finger 1602 after applying the mask 1608 to the raw image 1600 in FIG. 16A.

Another optional feature of identifying what aperture is in place is to facilitate consistent enlargement or "zoom" to the maximum size for that aperture. This is may be helpful when scanning the smallest newborn fingers, where the features and alignment needs to be checked visually on the computer screen. Predetermined fixed limits on the display that correspond to each aperture and the resultant collected image may be presented to the user in a standardized size and zoomed into the finger based upon the aperture detected. FIG. 16D shows a zoomed-in or enlarged image 1612 of the finger 1602 as it would be presented to the user on a display.

Identification of the aperture size selected by the user also gives facilitates the potential determination of the finger size. If the finger size is determined initially, image processing can tune the age adjustment calculation for faster results.

Identification that the aperture is not in its expected place also allows the software to reduce computation by not performing certain unnecessary functions when one or more imaging expected characteristics are absent or not otherwise detected. For example, auto exposure functions would only occur when aperture is in place.

Figures 12A, 12B, 12C:
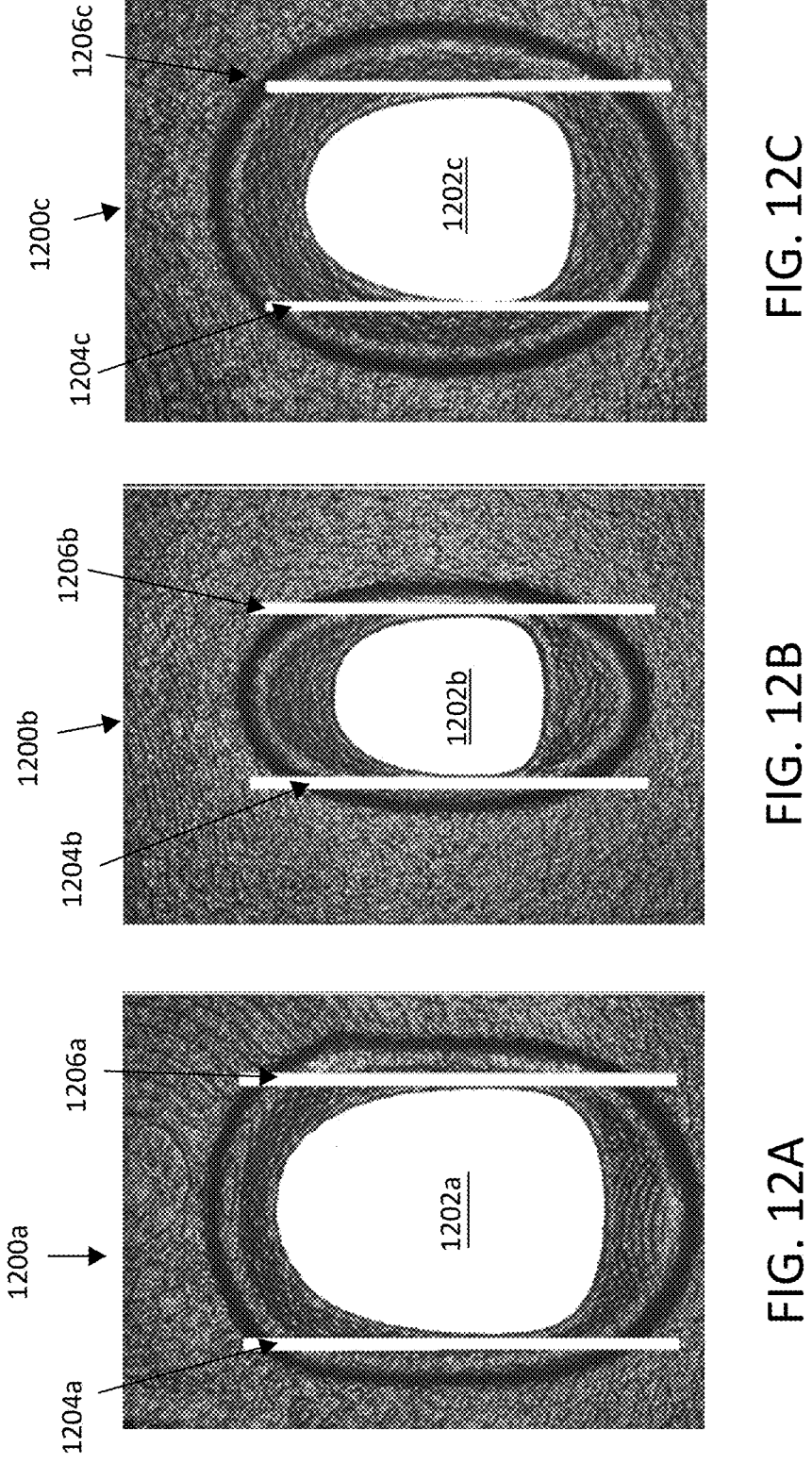
FIGS. 12A to 12C show bounding lines used to detect aperture size.

Other markings could also be used to show the size and current position of the aperture. FIGS. 12A to 12C, for example, shows a set of images 1200a-c of apertures 1202a-c where vertical lines 1204a-c, 1206a-c can be printed or formed on the underside of the rotary top that can be optically detected and used to determine what aperture is within the FOV of the camera. The vertical lines 1204a-c, 1206a-c may be simpler to detect via imaging processing the distance between the vertical lines 1204a-c, 1206a-c may be used to determine the aperture size or corresponding aperture 1202a-c. Other top configurations not based on the rotary design can also be used to adjust the size of the aperture. A movable aperture can be used, where one side of the aperture is fixed and the other can be moved to adjust the size of the opening. In this case, lines and/or a dot can be optical detected to determine the size the aperture in real-time. Examples of various movable apertures are described in U.S. Pat. Nos. 10,496,870 and 11,003,883. Distinct barcodes or QR codes for each aperture could also be used and detected with the camera.

FIG. 18 shows an overview of the system operation and software architecture 1800. Specifically, this flowchart shows the process 1800 for the collection of a single image of a finger and would be repeated for each finger, as desired by the operator. It shows that during collection, the raw image is streamed 1802, and other processes will only start upon detection of an aperture dot 1804. Once a dot is detected, other processes are initiated, such as exposure control 1806 and trigger activation 1808. Once a trigger is detection for collection 1810, the image is acquired 1812 processed to the desired image resolution in pixel per inch (PPI), processed for quality, and displayed back to the user. This process includes the application of the mask 1814, contrast enhancement 1816 and pixel/ridge analysis 1818. If a desired PPI level 1820 is provided, and the image is converted 1822 to the desired PPI. Fingerprint analysis 1824 is then performed on the converted image and various characteristics and score 1826, e.g. binary image quality score and number of minutiae, may be generated and displayed 1828, along with the processed and/or raw image. A second trigger push 1830 will restart the process.

For Infants and small children, the biometrician needs to physically place and align the finger onto the device without assistance from the subject. Due to the need to assist the subject, it is helpful that the device be operable with a single hand, freeing the second hand for placement and proper alignment of the subject's finger on the device.

The device is also designed symmetrically, so that it can be operated identically by right-handed or left-handed users. Specific designs that make it easier to operate specifically with one hand may be designed such that external features of the device are molded specifically for use with one hand or the other. Having specific left and right handed devices may be more comfortable to the user.

One feature of the device operation is the ability to acquire fingerprint images over a wide range of ages and finger sizes. Industry standard fingerprint devices are not used to collect images of children for several reasons: 1) the optical resolution of a standard fingerprinter is not detailed enough to detect the smaller ridge features, and 2) the child grows over time and the fingerprint image will be inconsistent and change over time.

Children fingerprint ridge features are very small and standard fingerprinter devices have an image resolution of 500 pixels/inch (PPI), with some newer models increasing to 1000 PPI. This resolution is sufficient to image the ridges of an adult fingerprint.

Regardless of whether the adult image was collected at 500 PPI or 1000 PPI, the standard fingerprint processing algorithms require that the images have 500 PPI resolution, since the image processing algorithms have all been trained on images of that resolution and most of the fingerprints in fingerprint databases were scanned and saved at that resolution.

For an adult, the distance between fingerprint ridges on adult fingers is about 400-500 microns, therefore 500 PPI, which has a sampling distance of 50 microns, will place 8-10 pixels between adjacent ridges. Children, on the other hand, have the same number of ridges. The child fingerprint is fully formed, but the ridges are distributed across a smaller finger that changes with age, thus the ridges are closer together. The smallest newborns may have only 125 microns between ridges and the 500 PPI imagers cannot adequately distinguish between adjacent ridges with only 2-4 pixels sampling. In addition, the image processing algorithms used in standard fingerprint devices expect there to be 8-10 pixels between ridges, thus the image processing algorithms that detect and enhance the contrast of the ridges will fail and incorrectly evaluate the children's image. In addition, as the child grows and the locations of the fingerprint minutiae locations will change over time, a newborn fingerprint will change enough that it will not match the fingerprint of the older child.

These issues are addressed by the device design by having both a high resolution imager and an image processing algorithm that corrects for the changing size of growing children. In order to have 10 pixels between the ridges of an infant, the image size of an individual pixel at the image plane needs to be ~12.5 microns, which corresponds to a resolution for the image of ~2000 PPI. The current device exceeds 3000 PPI to ensure that the small details of the child finger can be resolved.

Since the age and size of the fingers vary for individual and they change over time, the image processing conducted here will normalize all images to a constant number of pixels between each fingerprint ridge. Image processing algorithms are used to evaluate the average distance between ridges of each finger and then the image is resampled to place 8-10 pixels between ridges and create an the image that has a 500 PPI "adult equivalent" image that standard fingerprint biometric image enhancement systems can evaluate. All different finger sizes are resamples to have the same pixels between ridges, regardless of the original size of the finger.

Figure 13C:
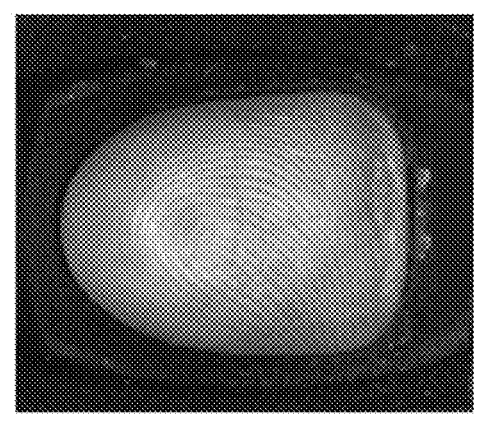
FIGS. 13A to 13F show finger images captured using different aperture sizes.
Figure 13F:
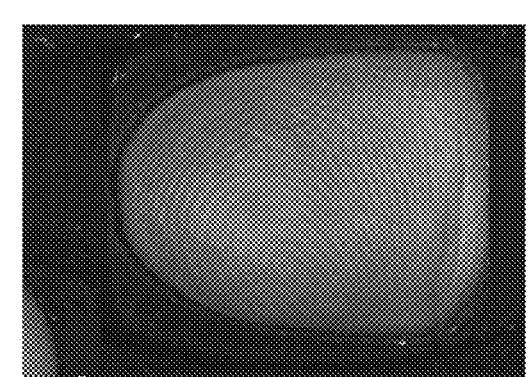
Figure 13B:
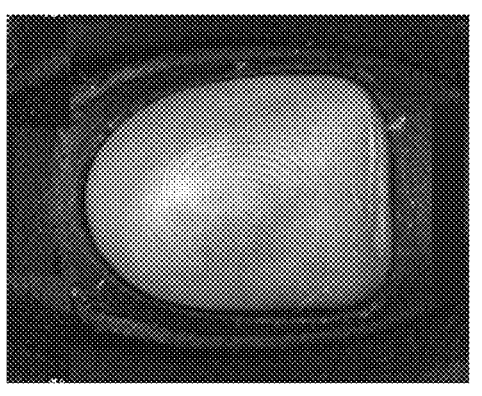
Figure 13E:
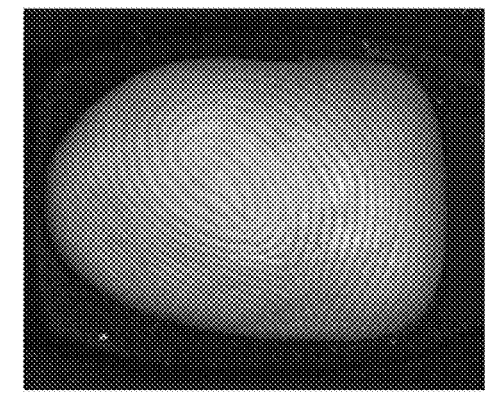
Figure 13A:
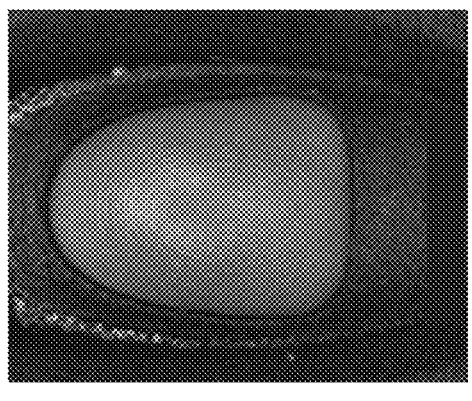
Figure 13D:
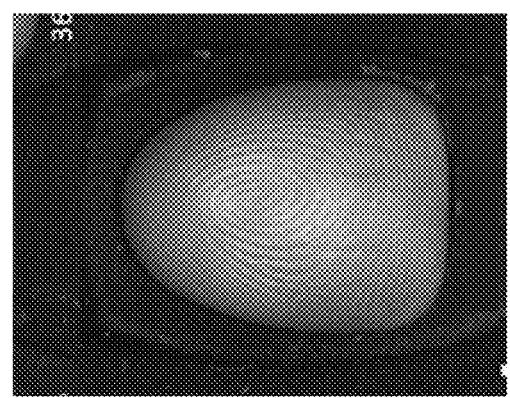

For example, FIGS. 13A to 13F depict images of fingers of different subjects of different ages and sizes. FIG. 13A is an infant finger that has ~20 pixels between each ridge of the fingerprint. FIG. 13B is an infant that has ~24 pixels between each ridge of the fingerprint. FIGS. 13C through 13E have 28, 32 and 36 pixels between each ridge, respectively. FIG. 13F is that of an adult and there are 40 pixels between each ridge.

Figures 14A, 14B, 14C, 14D, 14E, 14F:
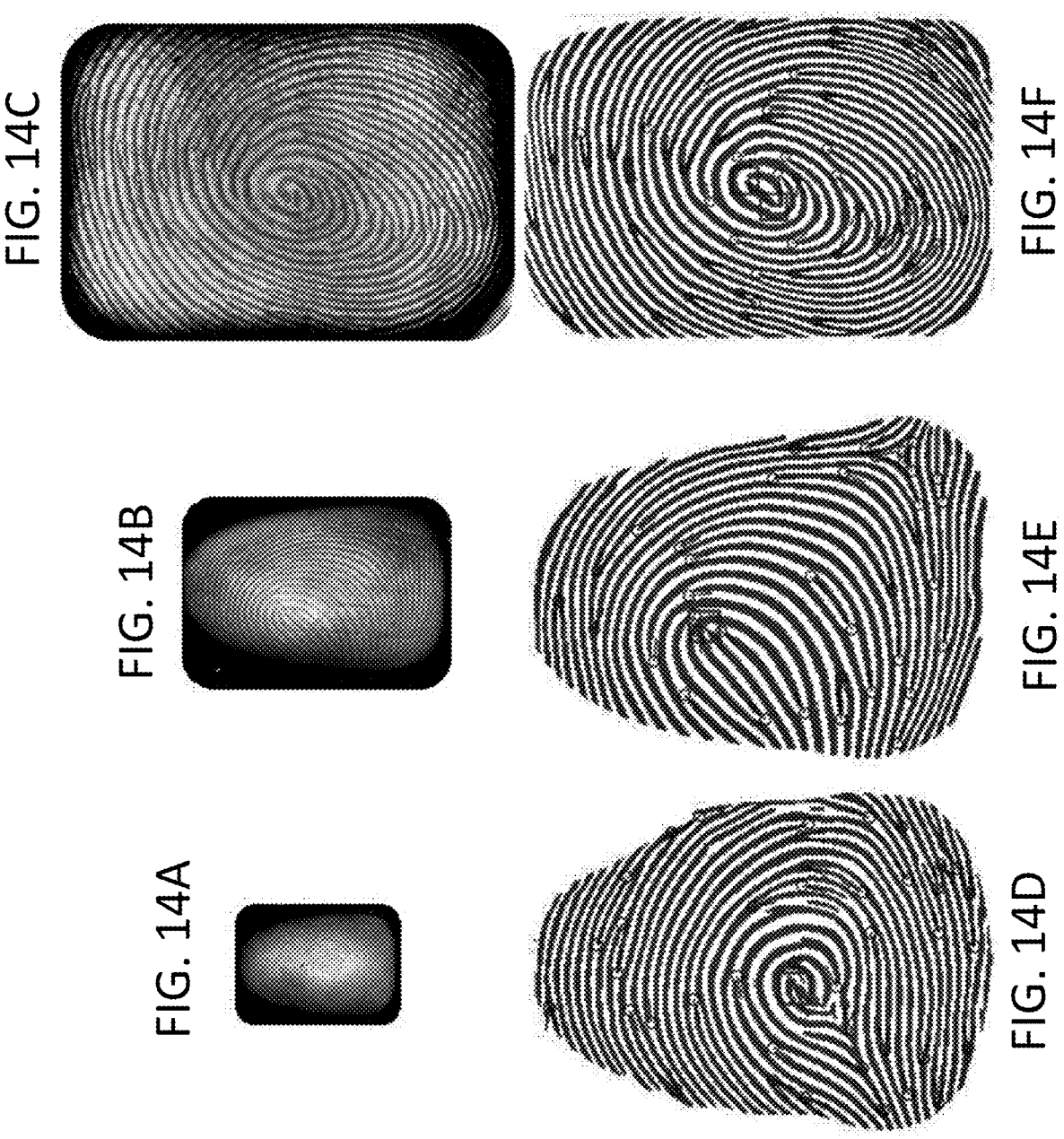
FIG. 14A shows a day of birth fingerprint image.
FIG. 14B shows a 1 year old's fingerprint image.
FIG. 14C shows an adult's fingerprint.
FIG. 14D shows a normalized minutiae map of the day of birth fingerprint image in FIG. 14A.
FIG. 14E shows a normalized minutiae map of the 1 year old's fingerprint image in FIG. 14B.
FIG. 14F shows a normalized minutiae map of the adult's fingerprint image in FIG. 14C.

The size differences may be addressed by producing fingerprint images at high resolution and down sampling to a standard 500 PPI equivalent image so that the fingerprint is normalized to a single size. FIG. 14A shows an image of an infant finger, FIG. 14B is a finger image of a 1 year old child and FIG. 14C is an image of an adult finger, each shown with their proper relative sizes with respect to each other. In order to evaluate images like these that have vastly different sizes, the fingerprints are normalized to a standard 500 PPI image, where there are 8-10 pixels between each fingerprint ridge. The result of doing that type of process is shown by the processed images in FIGS. 14D, 14E and 14F for the newborn, 1 year old and adult respectively. In FIGS. 14D to 14F, all of the finger sizes have been normalized to a consistent resolution. After normalizing, the various sized fingers are resampled and the resultant minutiae map for the prints may be identically sized regardless of the starting age.

The minutiae location map will expand as the child grows and researchers have developed mathematical models that can be used to correct for the age (and size) difference as the child grows. If an initial fingerprint was taken when the child was 1 year old and the second fingerprint is taken when the child is six years old, these models may be used to attempt to extrapolate or "grow" the earlier fingerprint minutiae template 5 years to attempt to match the later image. The growth factor is often an average of data taken for a group of children. This averaging, may be problematic in that children do not grow at the same rate or are the same size at any given age.

Some exemplary image processing methods directly measure the ridge distance or infer the density of ridges for each individual finger of the child in real-time. Some existing algorithms may utilize an average distance based on the age or age band of the child to correct the image. In some embodiments of the fingerprinting herein, however, the size of the specific finger for that child is measured and resampled to a consistent 500 PPI "adult equivalent". This is done for the same child or person regardless of image, and each is brought to the same nominal pixel/ridge value of 8-10 pixels per ridges, as shown in FIG. 1I, based on the image properties rather than reported child age. In this method, all finger images are brought to a known pixels/ridge, regardless of the age or size of the child, thus counteracting issues associated with assuming a child is the average size. This may be performed on an image-by-image basis, or may be calculated once per subject and reapplied to each subsequent image of that subject with repeating the PPI normalization process.

On a standard contact-based fingerprinting device, the finger can be placed onto the platen and rolled to collect data across the entire surface of the finger, often referred to as Nail-to-Nail (N2N). For non-contact device, using a single camera, this may not possible or easy to perform, but in some variation, multiple images of the finger may be taken from multiple angles by directing the subject and/or user to rotate the finger appropriately. The multiple images could then be stitched together to create an N2N composite image. This can be accomplished with the standard aperture or with a N2N custom aperture that helps the user align and rotate the finger to collect the image data.

In order to assist the user to collect the highest quality imagery, the device can provide feedback during collection to guide the user with respect to various image characteristics and the adequacy of the acquired image(s). One exemplary method is to utilize one or more core detection algorithms that mark the image to show the user where the fingerprint core is. For non-contact imaging, the curvature of the finger is a variable that can make enrollment and matching potentially difficult or challenging. Some data shows that the matching performance when the finger image and the verification finger image have the cores closely aligned may be helpful. One way to ensure this is to always have the images collected with the core at the center and/or direct the user to have multiple pictures collected where the core is in additional, well-defined locations. In some variations of the system, a standard collection procedure would guide the user to collect the multiple positions by tracking the position of the core and provide feedback that shows when the images needed have been collected. This can be accomplished by providing an image overlay with fiduciaries where the user needs to align the core of the subject's finger. Once an image has been collected that satisfies the core position required, the fiduciary mark can be changed to indicate that the position image has been collected and they can move to the next location. FIG. 17A shows a raw image of a finger with the automatic detection of a core 1700 shown by a box 1702, and FIG. 17B shows a group of five potential locations 1704 that is suggested to the user to position the core during image collection.

Another exemplary and optional quality feedback process that can be implemented involves detection of the pressure that the finger is exerting onto the device. As the user and subject place the finger onto an aperture, in some image acquisition processes it may be preferred if the finger is gently touching the aperture. If the finger is pushed against the device too hard, there is a tendency for the finger to be pushed through the aperture, resulting in stretching of the skin. When the skin is stretched, the ridges and valleys become less distinct and the contrast between the two are reduced. This will make it more difficult to analyze the image for ridge endings and bifurcations (i.e. minutiae). The image processing algorithm can potentially provide feedback on pressure in several ways. One is by image processing that looks for an increase in the pooling of blood in the center of the finger, based on the color or relative color change in the pixels, or light level or relative light level change in the pixels. As the finger pressure increases, the flow of blood is restricted and there will be a pool of blood located in the center of the finger surrounded by a reduction in blood at the finger/aperture contact point. That can be optically detected by evaluating the contrast in the image over the finger. Other methods can be exploited that detects the blood directly with spectral analysis, much like what is used in a pulse oximeter, but over the finger image to detect this pressure effect. Too high a pressure can be inferred by observing the contrast of the image in real-time. When contrast (between the ridges and valleys of the fingerprint) is significantly reduced, we can provide feedback to the user to suggest lowering the pressure placed on the device.

Some variations described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs); Compact Disc-Read Only Memories (CD-ROMs), and holographic devices; magneto-optical storage media such as optical disks; solid state storage devices such as a solid state drive (SSD) and a solid state hybrid drive (SSHD); carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices. Other variations described herein relate to a computer program product, which may include, for example, the instructions and/or computer code disclosed herein.

The systems, devices, and/or methods described herein may be performed by software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) may be expressed in a variety of software languages (e.g., computer code), including C, C++, JAVA®, Python, Ruby, VISUAL BASIC®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

In some variations, the systems and methods may be in communication with other computing devices (not shown) via, for example, one or more networks, each of which may be any type of network (e.g., wired network, wireless network). A wireless network may refer to any type of digital network that is not connected by cables of any kind. Examples of wireless communication in a wireless network include, but are not limited to cellular, radio, satellite, and microwave communication. However, a wireless network may connect to a wired network in order to interface with the Internet, other carrier voice and data networks, business networks, and personal networks. A wired network is typically carried over copper twisted pair, coaxial cable and/or fiber optic cables. There are many different types of wired networks including wide area networks (WAN), metropolitan area networks (MAN), local area networks (LAN), Internet area networks (IAN), campus area networks (CAN), wireless personal area network (PAN) (e.g., Bluetooth, Bluetooth Low Energy), global area networks (GAN), like the Internet, and virtual private networks (VPN). Hereinafter, network refers to any combination of wireless, wired, public and private data networks that are typically interconnected through the Internet, to provide a unified networking and information access system.

Cellular communication may encompass technologies such as GSM, PCS, CDMA or GPRS, W-CDMA, EDGE or CDMA2000, LTE, WiMAX, and 5G networking standards. Some wireless network deployments combine networks from multiple cellular networks or use a mix of cellular, Wi-Fi, and satellite communication. In some variations, the systems, devices, and methods described herein may include a radiofrequency receiver, transmitter, and/or optical (e.g., infrared) receiver and transmitter to communicate with one or more devices and/or networks.

While various embodiments above have been particularly shown and described with references to embodiments thereof, it will be understood by those skilled in the art that various changes in form and details may be made therein without departing from the scope of the embodiments. For all of the embodiments described above, the steps of the methods need not be performed sequentially.

What is claimed is:

1. A fingerprint input system, comprising:
   a main housing, comprising:
      an elongate handle comprising a longitudinal axis; and
      a rotation hub integrally formed with the elongate handle, the hub comprising:
         an upper convex surface;
         an imaging opening in the upper convex surface; and
         a circular flange surrounding the upper convex surface, the circular flange comprising a superior undulating surface;
      a plurality of peripheral hub magnets equally spaced around the circular flange and each of the plurality of hub magnets located a same hub radial distance from a center of the rotation hub;
      an actuator located on a front surface of the elongate handle;
      an imaging assembly inside the elongate handle and comprising an imaging axis;
      a detachable rotary aperture top configured to form rotational interface with the rotation hub, the selector comprising:

21 a concave lower surface configured to form a complementary rotational interface with the upper convex surface of the hub;

a plurality of finger receiving apertures, wherein each aperture is a different size and comprises a chamfered perimeter edge located in an aperture plane; and a plurality of flanges surrounding the concave lower surface and configured to extend radially outward beyond the circular flange of the rotation hub, wherein the plurality of flanges are radially offset from the plurality of finger receiving apertures, and wherein the plurality of flanges each comprise an undulating surface complementary to a portion of the undulating surface of the circular flange of the rotation hub;

a plurality of peripheral top magnets equally spaced around the plurality of flanges and each of the plurality of top magnets located a same top radial distance from a center of the top; and an optically transparent cover between the imaging assembly and the detachable rotary top.

2. The system of claim 1, wherein the optically transparent cover is oriented at an offset angle to the imaging axis.

3. The system of claim 2, wherein the optically transparent cover is orientation at an offset angle from a plane of the circular flange of the rotation hub.

4. The system of claim 2, wherein the rotation hub further comprises a center hub magnet located in a center of the rotation hub and the a center top magnet located in a center of the detachable rotary aperture top, wherein the center of the detachable rotary aperture top and the center of the rotation hub define a rotation axis.

5. A fingerprint input system, comprising:

a main housing, comprising:

an elongate handle comprising a longitudinal axis; and a rotation hub integrally formed with the elongate handle, the hub comprising:

a hub interface surface;

a center;

an imaging opening in the hub surface; and a first plurality of alignment structures equally spaced around the rotation hub and each of the plurality of alignment structures are located a same hub radial distance from the center of the rotation hub;

an actuator located on the elongate handle;

an imaging assembly inside the elongate handle and comprising an imaging axis;

a detachable rotary aperture top configured to form rotational interface with the rotation hub, the selector comprising:

a top interface surface configured to form a complementary rotational interface with the upper convex surface of the hub and comprising a center, wherein the center of the top and the center of the hub define a rotation axis;

a plurality of finger receiving apertures, wherein each aperture is a different size and comprises a chamfered perimeter edge located in an aperture plane;

a plurality of flanges surrounding the top interface surface and configured to extend radially outward beyond the rotation hub, wherein the plurality of flanges are radially offset from the plurality of finger receiving apertures; and

22 a second plurality of alignment structures arranged in a configuration complementary to the first plurality of alignment structures located on the rotation hub.

6. The system of claim 5, wherein the device further comprises an adjustable camera alignment mount.

7. The system of claim 6, wherein the adjustable camera alignment mount comprises a frame and three adjustment screws.

8. The system of claim 7, wherein the frame comprises a polygonal shape with four sides and four corners, with first of the three adjustment screws located in the middle of one of the four sides and the second and third adjustment screws located at two of the four corners farthest from the first screw.

9. The system of claim 7, wherein the adjustable camera alignment mount is releasably couplable to the imaging assembly via mount magnets attached to the frame.

10. The system of claim 7, wherein the imaging assembly is located in a frame opening of the frame.

11. The system of claim 7, wherein three magnets are embedded in the frame, and wherein the three adjustment screws are magnetically attachable to the magnets.

12. The system of claim 11, wherein the three adjustment screws are attached to the main housing.

13. The system of claim 6, further comprising a camera support between the imaging assembly and the adjustable camera alignment mount.

14. The system of claim 6, wherein the first plurality of alignment structures and the second plurality of alignment structures each comprise magnets.

15. The system of claim 14, further comprising a third plurality of alignment structures located on the rotation hub and a fourth plurality of alignment structures complementary to the third plurality of alignment structures and located on the detachable rotary aperture top.

16. The system of claim 15, wherein the third plurality of alignment structures comprises a plurality of alternating undulating or ramp surfaces, and the fourth plurality of alignment structures comprises a plurality of alternating undulating or ramp surfaces complementary to the third plurality of alignment structures.

17. The system of claim 16, wherein the third plurality of alignment structures are located along a superior peripheral circular surface of the rotation hub.

18. The system of claim 16, wherein the fourth plurality of alignment structures are located on inferior surfaces of the plurality of flanges.

19. The system of claim 5, further comprising a first heatsink thermally coupled to the imaging assembly.

20. The system of claim 5, further comprising a lighting assembly with a plurality of light sources within the main housing.

21. The system of claim 20, wherein the lighting assembly comprises a circular base.

22. The system of claim 20, further comprising a light diffuser above the lighting assembly.

23. The system of claim 20, further comprising a lighting heatsink thermally coupled to an inferior surface of the lighting assembly.

24. The system of claim 5, further comprising an elongate planar measurement tool comprising a plurality of different apertures arrange serially by size along the tool.

25. The system of claim 24, wherein the measurement tool further comprises a plurality of ordinal indicia corresponding to the plurality of different apertures.

* * * * *